United States Patent
Gao et al.

(10) Patent No.: US 11,159,299 B2
(45) Date of Patent: Oct. 26, 2021

(54) METHOD AND DEVICE FOR DIVIDING SHORT TRANSMISSION TIME INTERVAL OF SPECIAL SUBFRAME

(71) Applicant: CHINA ACADEMY OF TELECOMMUNICATIONS TECHNOLOGY, Beijing (CN)

(72) Inventors: Xuejuan Gao, Beijing (CN); Xiangli Lin, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/480,093

(22) PCT Filed: Feb. 8, 2018

(86) PCT No.: PCT/CN2018/075813
§ 371 (c)(1),
(2) Date: Jul. 23, 2019

(87) PCT Pub. No.: WO2018/137717
PCT Pub. Date: Aug. 2, 2018

(65) Prior Publication Data
US 2019/0379515 A1    Dec. 12, 2019

(30) Foreign Application Priority Data
Jan. 24, 2017   (CN) .......................... 201710055224.6

(51) Int. Cl.
*H04L 5/00*   (2006.01)
*H04W 72/04*   (2009.01)

(52) U.S. Cl.
CPC .......... *H04L 5/0092* (2013.01); *H04L 5/0048* (2013.01); *H04W 72/042* (2013.01); *H04W 72/0446* (2013.01)

(58) Field of Classification Search
CPC .............. H04W 72/042; H04W 84/12; H04W 74/0816; H04W 24/02; H04B 7/005; H04L 5/0092; H04L 5/0048
See application file for complete search history.

(56) References Cited

U.S. PATENT DOCUMENTS

2017/0331547 A1*  11/2017  Kim .................. H04L 5/0012
2017/0346604 A1   11/2017  Qu et al.
(Continued)

FOREIGN PATENT DOCUMENTS

CN   101400072 A   4/2009
CN   105991251 A   10/2016
(Continued)

OTHER PUBLICATIONS

Written Opinion for International Application No. PCT/CN2018/075813 dated Apr. 27, 2018.
(Continued)

*Primary Examiner* — Anez C Ebrahim
(74) *Attorney, Agent, or Firm* — Harness, Dickey & Pierce, P.L.C.

(57) ABSTRACT

A method and a device for dividing short TTIs of a special subframe are provided. The method includes: in a case that a configuration of a special subframe having a normal CP is used in downlink, and a DwPTS of the special subframe is used for short TTI transmission, dividing short TTIs in the DwPTS based on a predefined division pattern of short TTIs in a case that based on the configuration of the special subframe having the normal CP used in downlink and a length of a control region in the DwPTS, the DwPTS is determined to satisfy a division condition corresponding to the predefined division pattern of short TTIs.

20 Claims, 9 Drawing Sheets

(56) References Cited

U.S. PATENT DOCUMENTS

| | | |
|---|---|---|
| 2018/0042013 A1 | 2/2018 | Byun et al. |
| 2018/0132132 A1 | 5/2018 | Pan et al. |

FOREIGN PATENT DOCUMENTS

| | | |
|---|---|---|
| CN | 106160838 A | 11/2016 |
| WO | WO-2016077701 A1 | 5/2016 |
| WO | WO-2016143967 A1 | 9/2016 |

OTHER PUBLICATIONS

Chinese Office Action dated Dec. 29, 2018 for CN 201710055224.6.
Latency Reduction Solutions for TDD, Agenda item 6.2.10.2, Discussion and Decision, 3GPP TSG RAN WG1 Meeting #85, R1-164638, ZTE, ZTE Microelectronics, Nanjing, China, May 23-27, 2016.
International Preliminary Report on Patentability for International Application No. PCT/CN2018/075813 dated Aug. 8, 2019.

\* cited by examiner

In a case that a configuration of a special subframe having a normal CP is used in downlink, and a DwPTS of the special subframe is used for short TTI transmission, dividing short TTIs in the DwPTS based on a predefined division pattern of short TTIs in a case that based on the configuration of the special subframe having the normal CP used in the downlink and based on a length of a control region in the DwPTS, the DwPTS is determined to satisfy a division condition corresponding to the predefined division pattern of short TTIs.

201 — In a case that the configuration of a special subframe having the normal CP used in downlink is the second configuration, the fourth configuration, the seventh configuration, the ninth configuration, or the tenth configuration specified in the network protocol, and the quantity of symbols occupied by the control region in the DwPTS is two, determining that the DwPTS satisfies a division condition corresponding to a first division pattern of short TTIs defined in advance, and dividing short TTIs in the DwPTS based on the first division pattern of short TTIs, wherein, the first division pattern of short TTIs is a division pattern in which each of the short TTIs in the DwPTS occupies two symbols.

202 — In a case that the configuration of a special subframe having the normal CP used in downlink is the second configuration, the fourth configuration, the seventh configuration, the ninth configuration, or the tenth configuration specified in the network protocol, and the quantity of symbols occupied by the control region in the DwPTS is one, determining that the DwPTS satisfies a division condition corresponding to a second division pattern of short TTIs defined in advance, and dividing short TTIs in the DwPTS based on the second division pattern of short TTIs, wherein, the second division pattern of short TTIs is a division pattern in which the first short TTI occupies one symbol or three symbols, the second short TTI occupies three symbols, each of short TTIs other than the first short TTI and the second short TTI occupies two symbols; the first short TTI is a short TTI in which the control region in the DwPTS is located

FIG.2

```
┌─────────────────────────────────────────────────────────────────┐
│   In a case that the configuration of a special subframe having the normal CP  │
│   used in downlink is the second configuration, the fourth configuration, the  │
│     seventh configuration, the ninth configuration, or the tenth configuration │
│   specified in the network protocol, and the quantity of symbols occupied by the│
│      control region in the DwPTS is one or two, determining that the DwPTS     │        801
│    satisfies a division condition corresponding to a third division pattern of short│
│     TTIs defined in advance, and dividing short TTIs in the DwPTS based on the │
│        third division pattern of short TTIs, wherein, the third division pattern of short│
│   TTIs is a division pattern in which the first short TTI occupies four symbols, the│
│    second short TTI occupies two symbols, each of short TTIs other than the first│
│    short TTI and the second short TTI occupies two symbols; the first short TTI is│
│           a short TTI in which the control region in the DwPTS is located      │
└─────────────────────────────────────────────────────────────────┘
                                    │
                                    ▼
┌─────────────────────────────────────────────────────────────────┐
│   In a case that the configuration of a special subframe having the normal CP  │
│    used in downlink is the first configuration, the third configuration, the sixth│
│   configuration, or the eighth configuration specified in the network protocol, and│
│   the quantity of symbols occupied by the control region in the DwPTS is one or│        802
│   two, determining that the DwPTS satisfies a division condition corresponding to│
│      a fourth division pattern of short TTIs defined in advance, and dividing short│
│   TTIs in the DwPTS based on the fourth division pattern of short TTIs, wherein,│
│     the fourth division pattern of short TTIs is a division pattern in which the first│
│    short TTI occupies four symbols, the second short TTI occupies three symbols,│
│        each of short TTIs other than the first short TTI and the second short TTI│
│        occupies two symbols; the first short TTI is a short TTI in which the control│
│                       region in the DwPTS is located                           │
└─────────────────────────────────────────────────────────────────┘
```

FIG.8

| In a case that a configuration of a special subframe having a CP is used in downlink, and a DwPTS of the special subframe is used for short-TTI transmission, and in a case that based on the configuration of the special subframe having the normal CP used in the downlink and based on a length of a control region in the DwPTS, the DwPTS is determined to satisfy a division condition corresponding to a predefined division pattern of short TTIs, dividing the short TTI in the DwPTS based on the predefined division pattern of short TTIs | 1001 |

| In a case that a configuration of a special subframe having a normal CP is used in uplink and an UpPTS of the special subframe is used for short-TTI transmission, and in a case that the configuration of the special subframe having the normal CP used in uplink is the tenth configuration specified in the network protocol, dividing short TTIs in the UpPTS based on a pattern in which the quantities of symbols occupied by the first short TTI to the last short TTI are 2, 2, 2, respectively, or 3, 3, respectively, or 4, 2, respectively | 1002 |

FIG.10

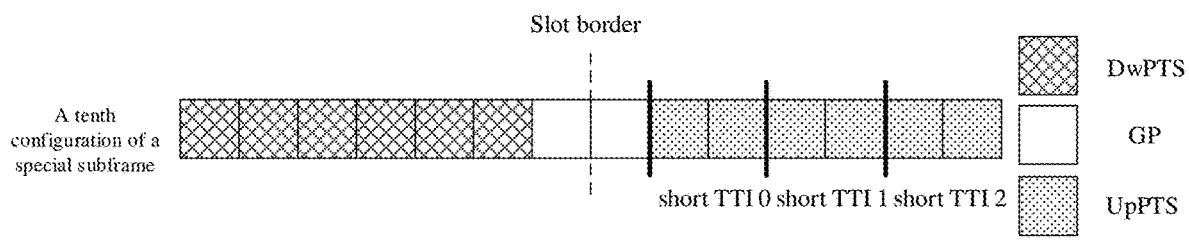

FIG.11

METHOD AND DEVICE FOR DIVIDING SHORT TRANSMISSION TIME INTERVAL OF SPECIAL SUBFRAME

CROSS-REFERENCE TO RELATED APPLICATIONS

This application is a U.S. national phase application of a PCT Application No. PCT/CN2018/075813 filed on Feb. 8, 2018. which claims a priority of a Chinese patent application No. 201710055224.6 filed in China on Jan. 24, 2017, the disclosure of which is incorporated herein in its entirety by reference.

TECHNICAL FIELD

The present disclosure relates to the field of communication technology, and in particular, relates to a method and a device for dividing short transmission time intervals (TTIs) of a special subframe.

BACKGROUND

With development and evolution of demands of mobile communication services, organizations such as the International Telecommunication Union (ITU) provide higher performance requirements on a user-plane latency of future mobile communication systems. A main method for shortening the user-plane latency is to reduce a length of a Transmission Time Interval (TTI), i.e., use a shorter TTI. For a downlink having short TTIs, the quantity of short TTIs that may be transmitted in a subframe (1 ms) and the quantity of Orthogonal Frequency Division Multiplexing (OFDM) symbols occupied by each short TTI need to be re-designed. Specifically, a clear solution for dividing short TTIs of a special subframe in a Long Term Evolution (LTE) Time Division Duplexing (TDD) system is not provided till now.

A current LTE Frequency Division Duplexing (FDD) system uses a Frame Structure type 1 (FS1, for short). In the FDD system, different carrier frequencies are used for uplink transmission and downlink transmission, respectively, but a same frame structure is used for both of the uplink transmission and the downlink transmission. On each carrier, a radio frame having a duration of 10 microsecond (ms) includes ten subframes, each of which has a duration of 1 ms and includes two slots, each of the two slots has a duration of 0.5 ms. A length of a TTI for data transmission in uplink and in downlink is 1 ms.

A current LTE TDD system uses a Frame Structure type 2 (FS2, for short). In the TDD system, different subframes or different slots in a same frequency band are used in both uplink transmission and downlink transmission. In the FS2, each radio frame having a duration of 10 ms includes two half-frames, each of which has a duration of 5 ms; each of the half-frames includes five subframes, each of the subframes has a duration of 1 ms. The subframes in the FS2 include three types: a downlink subframe, a uplink frame, and a special frame. Each of the special frames includes a Downlink Pilot Time Slot(DwPTS), a Guard Period (GP), and a Uplink Pilot Time Slot (UpPTS). Each half frame includes at least one downlink subframe and at least one uplink subframe, and at most one special frame.

A representative operational manner for a short TTI transmission is to incorporate multiple short TTI transmissions in a subframe structure defined in a current LTE mechanism, each of the short TTI transmissions has a length less than 1 ms. A shortened Physical Downlink Shared Channel (sPDSCH) and a shortened Physical Downlink Control Channel (sPDCCH) are supported in downlink. Two patterns exist for dividing short TTIs of a downlink normal subframe (1 ms). The quantity of symbols occupied by a short TTI may be 2 or 3, a first pattern {3, 2, 2, 2, 2, 3} of the two patterns is applied to a situation in which one or three symbols are occupied by a conventional control region, and a second pattern {2, 3, 2, 2, 2, 3} of the two patterns is applied to a situation in which two symbols are occupied by the conventional control region.

An existing division for short TTIs is directed to the normal subframe (1 ms). In a case that a short TTI transmission needs to be performed in the DwPTS in the special subframe, since multiple lengths may be configured for the DwPTS, the first pattern and the second pattern may not be used in a case that a length of symbols occupied by the DwPTS is 6, 10, 12, thereby causing emergence of a short TTI with single-symbol data transmission.

SUMMARY

An objective of the present disclosure is to provide a method and a device for dividing short Transmission Time Intervals (TTIs) of a special subframe, so as to address a problem in the related art that no clear division pattern of short TTIs is provided for the special subframe and a problem that, if a short-TTI transmission needs to be performed in the DwPTS in the special subframe, a current division pattern of short TTIs causes a short TTI with single-symbol data transmission to emerge.

To solve the above technical problems, some embodiments of the present disclosure provide a method for dividing short Transmission Time Intervals (TTIs) of a special subframe. The method includes: in a case that a configuration of a special subframe having a normal cyclic prefix (CP) is used in downlink, and a Downlink Pilot Time Slot (DwPTS) of the special subframe is used for short TTI transmission, dividing short TTIs in the DwPTS based on a predefined division pattern of short TTIs in a case that based on the configuration of the special subframe having the normal CP used in downlink and based on a length of a control region in the DwPTS, the DwPTS is determined to satisfy a division condition corresponding to the predefined division pattern of short TTIs.

In some optional embodiments, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to a predefined division pattern of short TTIs, includes: in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is two, determining that the DwPTS satisfies a division condition corresponding to a first division pattern of short TTIs defined in advance, and dividing short TTIs in the DwPTS based on the first division pattern of short TTIs, wherein, the first division pattern of short TTIs is a division pattern in which each of the short TTIs in the DwPTS occupies two symbols.

In some optional embodiments, after dividing short TTIs in the DwPTS based on the first division pattern of short TTIs, in a case that the configuration of the special subframe having the normal CP used in downlink is the ninth configuration or the tenth configuration specified in the network protocol, a division pattern of short TTIs in the DwPTS is a pattern in which quantities of symbols occupied by a first short TTI to a last short TTI are 2, 2, 2, respectively; in a case that the configuration of the special subframe having the normal CP used in downlink is the second configuration or the seventh configuration specified in the network protocol, the division pattern of short TTIs in the DwPTS is a pattern in which quantities of symbols occupied by the first short TTI to the last short TTI are 2, 2, 2, 2, 2, respectively; in a case that the configuration of the special subframe having the normal CP used in downlink is the fourth configuration specified in the network protocol, the division pattern of short TTIs in the DwPTS is a pattern in which quantities of symbols occupied by the first short TTI to the last short TTI are 2, 2, 2, 2, 2, 2, respectively.

In some optional embodiments, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, includes: in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is one, determining that the DwPTS satisfies a division condition corresponding to a second division pattern of short TTIs defined in advance, and dividing short TTIs in the DwPTS based on the second division pattern of short TTIs, wherein, the second division pattern of short TTIs is a division pattern in which a first short TTI occupies one symbol or three symbols, a second short TTI occupies three symbols, each of short TTIs other than the first short TTI and the second short TTI occupies two symbols; the first short TTI is a short TTI in which the control region in the DwPTS is located.

In some optional embodiments, the first short TTI is a first short TTI in the DwPTS, and the second short TTI is a last short TTI in the DwPTS, and after dividing short TTIs in the DwPTS based on the second division pattern of short TTIs, in a case that the configuration of the special subframe having the normal CP used in downlink is the ninth configuration or the tenth configuration specified in the network protocol, a division pattern of short TTIs in the DwPTS is a pattern in which quantities of symbols occupied by the first short TTI to the last short TTI are 1, 2, 3, respectively, or 3, 3, respectively; in a case that the configuration of the special subframe having the normal CP used in downlink is the second configuration or the seventh configuration specified in the network protocol, the division pattern of short TTIs in the DwPTS is a pattern in which quantities of symbols occupied by the first short TTI to the last short TTI are 1, 2, 2, 2, 3, respectively, or 3, 2, 2, 3, respectively; in a case that the configuration of the special subframe having the normal CP used in downlink is the fourth configuration specified in the network protocol, the division pattern of short TTIs in the DwPTS is a pattern in which quantities of symbols occupied by the first short TTI to the last short TTI are 1, 2, 2, 2, 2, 3, respectively, or 3, 2, 2, 2, 3, respectively.

In some optional embodiments, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, includes: in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is one or two, determining that the DwPTS satisfies a division condition corresponding to a third division pattern of short TTIs defined in advance, and dividing short TTIs in the DwPTS based on the third division pattern of short TTIs, wherein, the third division pattern of short TTIs is a division pattern in which a first short TTI occupies four symbols, a second short TTI occupies two symbols, each of short TTIs other than the first short TTI and the second short TTI occupies two symbols; the first short TTI is a short TTI in which the control region in the DwPTS is located.

In some optional embodiments, the first short TTI is a first short TTI in the DwPTS, and the second short TTI is a last short TTI in the DwPTS, and after dividing short TTIs in the DwPTS based on the third division pattern of short TTIs, in a case that the configuration of the special subframe having the normal CP used in downlink is the ninth configuration or the tenth configuration specified in the network protocol, the division pattern of short TTIs in the DwPTS is a pattern in which quantities of symbols occupied by the first short TTI to the last short TTI are 4, 2, respectively; in a case that the configuration of the special subframe having the normal CP used in downlink is the second configuration or the seventh configuration specified in the network protocol, the division pattern of short TTIs in the DwPTS is a pattern in which quantities of symbols occupied by the first short TTI to the last short TTI are 4, 2, 2, 2, respectively; in a case that the configuration of the special subframe having the normal CP used in downlink is the fourth configuration specified in the network protocol, the division pattern of short TTIs in the DwPTS is a pattern in which quantities of symbols occupied by the first short TTI to the last short TTI are 4, 2, 2, 2, 2, respectively.

In some optional embodiments, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, includes: in a case that the configuration of the special subframe having the normal CP used in downlink is a first configuration, a third configuration, a sixth configuration, or an eighth configuration specified in a network protocol, and a quantity of symbols occupied by the control region in the DwPTS is one or two, determining that the DwPTS satisfies a division condition corresponding to a fourth division pattern of short TTIs defined in advance, and dividing short TTIs in the DwPTS based on the fourth division pattern of short TTIs, wherein, the fourth division pattern of short TTIs is a division pattern in which a first short TTI occupies four symbols, a second short TTI occupies three symbols, each of short TTIs other than the first short TTI and the second short TTI occupies two symbols; the first short TTI is a short TTI in which the control region in the DwPTS is located.

In some optional embodiments, the first short TTI is a first short TTI in the DwPTS, and the second short TTI is a last short TTI in the DwPTS, and after dividing short TTIs in the DwPTS based on the fourth division pattern of short TTIs, in a case that the configuration of the special subframe having the normal CP used in downlink is the first configuration or the sixth configuration specified in the network protocol, the division pattern of short TTIs in the DwPTS is a pattern in which quantities of symbols occupied by the first short TTI to the last short TTI are 4, 2, 3, respectively;

in a case that the configuration of the special subframe having the normal CP used in downlink is the third configuration or the eighth configuration specified in the network protocol, the division pattern of short TTIs in the DwPTS is a pattern in which quantities of symbols occupied by the first short TTI to the last short TTI are 4, 2, 2, 3, respectively.

In some optional embodiments, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, includes: in a case that the configuration of the special subframe having the normal CP used in downlink is a second configuration or a seventh configuration specified in a network protocol, and a quantity of symbols occupied by the control region in the DwPTS is two, determining that the DwPTS satisfies a division condition corresponding to a fifth division pattern of short TTIs defined in advance, and dividing short TTIs in the DwPTS based on the fifth division pattern of short TTIs, wherein, the fifth division pattern of short TTIs is a division pattern in which quantities of symbols occupied by a first short TTI to a last short TTI are 2, 3, 2, 3, respectively; in a case that the configuration of the special subframe having the normal CP used in downlink is a fourth configuration specified in a network protocol, and a quantity of symbols occupied by the control region in the DwPTS is two, determining that the DwPTS satisfies a division condition corresponding to a sixth division pattern of short TTIs defined in advance, and dividing short TTIs in the DwPTS based on the sixth division pattern of short TTIs, wherein, the sixth division pattern of short TTIs is a division pattern in which quantities of symbols occupied by the first short TTI to the last short TTI are 2, 3, 2, 2, 3, respectively, or 2, 3, 2, 3, 2, respectively.

In some optional embodiments, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, includes: in a case that the configuration of the special subframe having the normal CP used in downlink is a ninth configuration or a tenth configuration specified in a network protocol, and a quantity of symbols occupied by the control region in the DwPTS is one, determining that the DwPTS satisfies a division condition corresponding to a seventh division pattern of short TTIs defined in advance, and dividing short TTIs in the DwPTS based on the seventh division pattern of short TTIs, wherein, the seventh division pattern of short TTIs is a division pattern in which quantities of symbols occupied by the first short TTI to the last short TTI are 1, 3, 2, respectively; in a case that the configuration of the special subframe having the normal CP used in downlink is a second configuration or a seventh configuration specified in a network protocol, and a quantity of symbols occupied by the control region in the DwPTS is one, determining that the DwPTS satisfies a division condition corresponding to an eighth division pattern of short TTIs defined in advance, and dividing short TTIs in the DwPTS based on the eighth division pattern of short TTIs, wherein, the eighth division pattern of short TTIs is a division pattern in which quantities of symbols occupied by the first short TTI to the last short TTI are 3, 2, 2, 3, respectively; in a case that the configuration of the special subframe having the normal CP used in downlink is a fourth configuration specified in a network protocol, and a quantity of symbols occupied by the control region in the DwPTS is one, determining that the DwPTS satisfies a division condition corresponding to a ninth division pattern of short TTIs defined in advance, and dividing short TTIs in the DwPTS based on the ninth division pattern of short TTIs, wherein, the ninth division pattern of short TTIs is a division pattern in which quantities of symbols occupied by the first short TTI to the last short TTI are 3, 2, 2, 2, 3, respectively, or 3, 2, 2, 3, 2, respectively.

In some optional embodiments, the method further includes: in a case that a configuration of a special subframe having a normal CP is used in uplink and an Uplink Pilot Time Slot (UpPTS) of the special subframe is used for short-TTI transmission, dividing short TTIs in the UpPTS based on a pattern in which quantities of symbols occupied by a first short TTI to a last short TTI are 2, 2, 2, respectively, or 3, 3, respectively, or 4, 2, respectively, in a case that the configuration of the special subframe having the normal CP used in uplink is a tenth configuration specified by a network protocol.

In some optional embodiments, the method further includes: in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a ninth configuration or a tenth configuration specified in the network protocol, and a quantity of symbols occupied by the control region in the DwPTS is two, dividing short TTIs in a special subframe based on a pattern in which quantities of symbols occupied by a first short TTI to a last short TTI are 2, 2, 2, 2, 2, 2, 2, respectively, or 2, 2, 2, 3, 3, 2, respectively, or 2, 2, 2, 2, 4, 2, respectively, or 2, 2, 2, 2, 2, 4, respectively; in a case that each of the configurations of special frames having the normal CP used in uplink and in downlink is the ninth configuration or the tenth configuration specified in the network protocol, and a quantity of symbols occupied by the control region in the DwPTS is one, dividing short TTIs in a special subframe based on a pattern in which quantities of symbols occupied by a first short TTI to a last short TTI are 3, 3, 2, 3, 3, respectively, or 3, 3, 2, 2, 2, 2, respectively, or 3, 3, 2, 2, 4, respectively, or 3, 3, 2, 4, 2, respectively.

In some optional embodiments, the method further includes: in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a ninth configuration or a tenth configuration specified in the network protocol, and a quantity of symbols occupied by the control region in the DwPTS is one or two, dividing short TTIs in a special subframe based on a pattern in which quantities of symbols occupied by a first short TTI to a last short TTI are 4, 2, 2, 2, 2, 2, respectively, or 4, 2, 2, 4, 2, respectively, or 4, 2, 2, 2, 4, respectively, or 4, 2, 2, 3, 3, respectively.

In some optional embodiments, the method further includes: in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a second configuration, a fourth configuration, or a seventh configuration specified in the network protocol, and a quantity of symbols occupied by the control region in the DwPTS is two, dividing short TTIs in a special subframe based on a pattern in which quantities of symbols occupied by a first short TTI to a last short TTI are 2, 3, 2, 3, 2, 2, respectively; in a case that each of the configurations of special frames having the normal CP used in uplink and in downlink is the second configuration, the fourth configuration, or the seventh configuration specified in the network protocol, and the quantity of symbols occupied by the control region in the DwPTS is one, dividing short TTIs in a special subframe based on a pattern in which quantities of symbols occupied by the first short TTI to the last short TTI are 3, 2, 2, 3, 2, 2, respectively.

In some optional embodiments, the method further includes: in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a first configuration, a third configuration, a sixth configuration, or an eighth configuration specified in the network protocol, and a quantity of symbols occupied by the control region in the DwPTS is two, dividing short TTIs in a special subframe based on a pattern in which quantities of symbols occupied by a first short TTI to a last short TTI are 2, 3, 2, 2, 2, 3, respectively; in a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is one, dividing short TTIs in a special subframe based on a pattern in which quantities of symbols occupied by the first short TTI to the last short TTI are 3, 2, 2, 2, 2, 3, respectively.

To solve the above technical problems, some embodiments of the present disclosure further provide a device for dividing short Transmission Time Intervals (TTIs) of a special subframe. The device includes: a first division module, configured to: in a case that a configuration of a special subframe having a normal cyclic prefix (CP) is used in downlink, and a Downlink Pilot Time Slot (DwPTS) of the special subframe is used for short TTI transmission, divide short TTIs in the DwPTS based on a predefined division pattern of short TTIs in a case that based on the configuration of the special subframe having the normal CP used in downlink and based on a length of a control region in the DwPTS, the DwPTS is determined to satisfy a division condition corresponding to the predefined division pattern of short TTIs.

In some optional embodiments, the first division module is specifically configured to: in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is two, determine that the DwPTS satisfies a division condition corresponding to a first division pattern of short TTIs defined in advance, and divide short TTIs in the DwPTS based on the first division pattern of short TTIs, wherein, the first division pattern of short TTIs is a division pattern in which each of the short TTIs in the DwPTS occupies two symbols.

In some optional embodiments, after the first division module divides short TTIs in the DwPTS based on the first division pattern of short TTIs, in a case that the configuration of the special subframe having the normal CP used in downlink is the ninth configuration or the tenth configuration specified in the network protocol, a division pattern of short TTIs in the DwPTS is a pattern in which quantities of symbols occupied by a first short TTI to a last short TTI are 2, 2, 2, respectively; in a case that the configuration of the special subframe having the normal CP used in downlink is the second configuration or the seventh configuration specified in the network protocol, the division pattern of short TTIs in the DwPTS is a pattern in which quantities of symbols occupied by the first short TTI to the last short TTI are 2, 2, 2, 2, 2, respectively; in a case that the configuration of the special subframe having the normal CP used in downlink is the fourth configuration specified in the network protocol, the division pattern of short TTIs in the DwPTS is a pattern in which quantities of symbols occupied by the first short TTI to the last short TTI are 2, 2, 2, 2, 2, 2, respectively.

In some optional embodiments, the first division module is specifically configured to: in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is one, determine that the DwPTS satisfies a division condition corresponding to a second division pattern of short TTIs defined in advance, and divide short TTIs in the DwPTS based on the second division pattern of short TTIs, wherein, the second division pattern of short TTIs is a division pattern in which a first short TTI occupies one symbol or three symbols, a second short TTI occupies three symbols, each of short TTIs other than the first short TTI and the second short TTI occupies two symbols; the first short TTI is a short TTI in which the control region in the DwPTS is located.

In some optional embodiments, the first short TTI is a first short TTI in the DwPTS, and the second short TTI is a last short TTI in the DwPTS, and after the first division module divides short TTIs in the DwPTS based on the second division pattern of short TTIs, in a case that the configuration of the special subframe having the normal CP used in downlink is the ninth configuration or the tenth configuration specified in the network protocol, a division pattern of short TTIs in the DwPTS is a pattern in which quantities of symbols occupied by the first short TTI to the last short TTI are 1, 2, 3, respectively, or 3, 3, respectively; in a case that the configuration of the special subframe having the normal CP used in downlink is the second configuration or the seventh configuration specified in the network protocol, the division pattern of short TTIs in the DwPTS is a pattern in which quantities of symbols occupied by the first short TTI to the last short TTI are 1, 2, 2, 2, 3, respectively, or 3, 2, 2, 3, respectively; in a case that the configuration of the special subframe having the normal CP used in downlink is the fourth configuration specified in the network protocol, the division pattern of short TTIs in the DwPTS is a pattern in which quantities of symbols occupied by the first short TTI to the last short TTI are 1, 2, 2, 2, 2, 3, respectively, or 3, 2, 2, 2, 3, respectively.

In some optional embodiments, the first division module is specifically configured to: in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is one or two, determine that the DwPTS satisfies a division condition corresponding to a third division pattern of short TTIs defined in advance, and divide short TTIs in the DwPTS based on the third division pattern of short TTIs, wherein, the third division pattern of short TTIs is a division pattern in which a first short TTI occupies four symbols, a second short TTI occupies two symbols, each of short TTIs other than the first short TTI and the second short TTI occupies two symbols; the first short TTI is a short TTI in which the control region in the DwPTS is located.

In some optional embodiments, the first short TTI is a first short TTI in the DwPTS, and the second short TTI is a last short TTI in the DwPTS, and after the first division module divides short TTIs in the DwPTS based on the third division pattern of short TTIs, in a case that the configuration of the special subframe having the normal CP used in downlink is the ninth configuration or the tenth configuration specified in the network protocol, the division pattern of short TTIs in the DwPTS is a pattern in which quantities of symbols occupied by the first short TTI to the last short TTI are 4, 2, respectively; in a case that the configuration of the special subframe having the normal CP used in downlink is the second configuration or the seventh configuration specified in the network protocol, the division pattern of short TTIs in the DwPTS is a pattern in which quantities of symbols occupied by the first short TTI to the last short TTI are 4, 2, 2, 2, respectively; in a case that the configuration of the special subframe having the normal CP used in downlink is the fourth configuration specified in the network protocol, the division pattern of short TTIs in the DwPTS is a pattern in which quantities of symbols occupied by the first short TTI to the last short TTI are 4, 2, 2, 2, 2, respectively.

In some optional embodiments, the first division module is specifically configured to: in a case that the configuration of the special subframe having the normal CP used in downlink is a first configuration, a third configuration, a sixth configuration, or an eighth configuration specified in a network protocol, and a quantity of symbols occupied by the control region in the DwPTS is one or two, determine that the DwPTS satisfies a division condition corresponding to a fourth division pattern of short TTIs defined in advance, and divide short TTIs in the DwPTS based on the fourth division pattern of short TTIs, wherein, the fourth division pattern of short TTIs is a division pattern in which a first short TTI occupies four symbols, a second short TTI occupies three symbols, each of short TTIs other than the first short TTI and the second short TTI occupies two symbols; the first short TTI is a short TTI in which the control region in the DwPTS is located.

In some optional embodiments, the first short TTI is a first short TTI in the DwPTS, and the second short TTI is a last short TTI in the DwPTS, and after the first division module divides short TTIs in the DwPTS based on the fourth division pattern of short TTIs, in a case that the configuration of the special subframe having the normal CP used in downlink is the first configuration or the sixth configuration specified in the network protocol, the division pattern of short TTIs in the DwPTS is a pattern in which quantities of symbols occupied by the first short TTI to the last short TTI are 4, 2, 3, respectively; in a case that the configuration of the special subframe having the normal CP used in downlink is the third configuration or the eighth configuration specified in the network protocol, the division pattern of short TTIs in the DwPTS is a pattern in which quantities of symbols occupied by the first short TTI to the last short TTI are 4, 2, 2, 3, respectively.

In some optional embodiments, the first division module is specifically configured to: in a case that the configuration of the special subframe having the normal CP used in downlink is a second configuration or a seventh configuration specified in a network protocol, and a quantity of symbols occupied by the control region in the DwPTS is two, determine that the DwPTS satisfies a division condition corresponding to a fifth division pattern of short TTIs defined in advance, and divide short TTIs in the DwPTS based on the fifth division pattern of short TTIs, wherein, the fifth division pattern of short TTIs is a division pattern in which quantities of symbols occupied by a first short TTI to a last short TTI are 2, 3, 2, 3, respectively; in a case that the configuration of the special subframe having the normal CP used in downlink is a fourth configuration specified in a network protocol, and a quantity of symbols occupied by the control region in the DwPTS is two, determine that the DwPTS satisfies a division condition corresponding to a sixth division pattern of short TTIs defined in advance, and divide short TTIs in the DwPTS based on the sixth division pattern of short TTIs, wherein, the sixth division pattern of short TTIs is a division pattern in which quantities of symbols occupied by the first short TTI to the last short TTI are 2, 3, 2, 2, 3, respectively, or 2, 3, 2, 3, 2, respectively.

In some optional embodiments, the first division module is specifically configured to: in a case that the configuration of the special subframe having the normal CP used in downlink is a ninth configuration or a tenth configuration specified in a network protocol, and a quantity of symbols occupied by the control region in the DwPTS is one, determine that the DwPTS satisfies a division condition corresponding to a seventh division pattern of short TTIs defined in advance, and divide short TTIs in the DwPTS based on the seventh division pattern of short TTIs, wherein, the seventh division pattern of short TTIs is a division pattern in which quantities of symbols occupied by the first short TTI to the last short TTI are 1, 3, 2, respectively; in a case that the configuration of the special subframe having the normal CP used in downlink is a second configuration or a seventh configuration specified in a network protocol, and a quantity of symbols occupied by the control region in the DwPTS is one, determine that the DwPTS satisfies a division condition corresponding to an eighth division pattern of short TTIs defined in advance, and divide short TTIs in the DwPTS based on the eighth division pattern of short TTIs, wherein, the eighth division pattern of short TTIs is a division pattern in which quantities of symbols occupied by the first short TTI to the last short TTI are 3, 2, 2, 3, respectively; in a case that the configuration of the special subframe having the normal CP used in downlink is a fourth configuration specified in a network protocol, and a quantity of symbols occupied by the control region in the DwPTS is one, determine that the DwPTS satisfies a division condition corresponding to a ninth division pattern of short TTIs defined in advance, and divide short TTIs in the DwPTS based on the ninth division pattern of short TTIs, wherein, the ninth division pattern of short TTIs is a division pattern in which quantities of symbols occupied by the first short TTI to the last short TTI are 3, 2, 2, 2, 3, respectively, or 3, 2, 2, 3, 2, respectively.

In some optional embodiments, the device further includes a second division module, configured to: in a case that a configuration of a special subframe having a normal CP is used in uplink and an Uplink Pilot Time Slot (UpPTS) of the special subframe is used for short-TTI transmission, divide short TTIs in the UpPTS based on a pattern in which quantities of symbols occupied by a first short TTI to a last short TTI are 2, 2, 2, respectively, or 3, 3, respectively, or 4, 2, respectively, in a case that the configuration of the special subframe having the normal CP used in uplink is a tenth configuration specified by a network protocol.

In some optional embodiments, the device further includes a third division module configured to: in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a ninth configuration or a tenth configuration specified in the network protocol, and a quantity of symbols occupied by the control region in the DwPTS is two, divide short TTIs in a special subframe based on a pattern in which quantities of symbols occupied by a first short TTI to a last short TTI are 2, 2, 2, 2, 2, 2, 2, respectively, or 2, 2, 2, 3, 3, 2, respectively, or 2, 2, 2, 2, 4, 2, respectively, or 2, 2, 2, 2, 2, 4, respectively; in a case that each of the configurations of special frames having the normal CP used in uplink and in downlink is the ninth configuration or the tenth configuration specified in the network protocol, and a quantity of symbols occupied by the control region in the DwPTS is one, divide short TTIs in a special subframe based on a pattern in which quantities of symbols occupied by a first short TTI to a last short TTI are 3, 3, 2, 3, 3, respectively, or 3, 3, 2, 2, 2, 2, respectively, or 3, 3, 2, 2, 4, respectively, or 3, 3, 2, 4, 2, respectively.

In some optional embodiments, the device further includes a fourth division module configured to: in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a ninth configuration or a tenth configuration specified in the network protocol, and a quantity of symbols occupied by the control region in the DwPTS is one or two, divide short TTIs in a special subframe based on a pattern in which quantities of symbols occupied by a first short TTI to a last short TTI are 4, 2, 2, 2, 2, 2, respectively, or 4, 2, 2, 4, 2, respectively, or 4, 2, 2, 2, 4, respectively, or 4, 2, 2, 3, 3, respectively.

In some optional embodiments, the device further includes a fifth division module configured to: in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a second configuration, a fourth configuration, or a seventh configuration specified in the network protocol, and a quantity of symbols occupied by the control region in the DwPTS is two, divide short TTIs in a special subframe based on a pattern in which quantities of symbols occupied by a first short TTI to a last short TTI are 2, 3, 2, 3, 2, 2, respectively;

in a case that each of the configurations of special frames having the normal CP used in uplink and in downlink is the second configuration, the fourth configuration, or the seventh configuration specified in the network protocol, and the quantity of symbols occupied by the control region in the DwPTS is one, divide short TTIs in a special subframe based on a pattern in which quantities of symbols occupied by a first short TTI to a last short TTI are 3, 2, 2, 3, 2, 2, respectively.

In some optional embodiments, the device further includes a sixth division module configured to: in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a first configuration, a third configuration, a sixth configuration, or an eighth configuration specified in the network protocol, and a quantity of symbols occupied by the control region in the DwPTS is two, divide short TTIs in a special subframe based on a pattern in which quantities of symbols occupied by a first short TTI to a last short TTI are 2, 3, 2, 2, 2, 3, respectively; in a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is one, divide short TTIs in a special subframe based on a pattern in which quantities of symbols occupied by a first short TTI to a last short TTI are 3, 2, 2, 2, 2, 3, respectively.

Some embodiments of the present disclosure further provide a device for dividing short Transmission Time Intervals (TTIs) of a special subframe. The device includes a processor, a storage, and a transceiver, wherein the storage is configured to store programs and data used by the processor when the processor performs operations, and when the processor invokes and performs the programs and the data stored in the storage, the processor performs following steps: in a case that a configuration of a special subframe having a normal cyclic prefix (CP) is used in downlink, and a Downlink Pilot Time Slot (DwPTS) of the special subframe is used for short TTI transmission, dividing short TTIs in the DwPTS based on a predefined division pattern of short TTIs in a case that based on the configuration of the special subframe having the normal CP used in downlink and based on a length of a control region in the DwPTS, the DwPTS is determined to satisfy a division condition corresponding to the predefined division pattern of short TTIs; wherein the transceiver is configured to receive data and transmit data.

Beneficial effects of the technical solutions provided hereinbefore in the present disclosure are as follow: according to the method for dividing short TTIs of a special subframe, in a case that a configuration of a special subframe having a normal CP is used in downlink, and a DwPTS of the special subframe is used for short TTI transmission, short TTIs in the DwPTS are divided based on a predefined division pattern of short TTIs in a case that based on the configuration of the special subframe having the normal CP used in downlink and based on a length of a control region in the DwPTS, the DwPTS is determined to satisfy a division condition corresponding to the predefined division pattern of short TTIs. In a case that a configuration of a special subframe having a normal CP is used in uplink and an UpPTS of the special subframe is used for short-TTI transmission, short TTIs in the UpPTS are divided based on a pattern in which quantities of symbols occupied by a first short TTI to a last short TTI are 2, 2, 2, respectively, or 3, 3, respectively, or 4, 2, respectively, in a case that the configuration of the special subframe having the normal CP used in uplink is a tenth configuration specified by a network protocol. The method provided in the present disclosure may determine a division pattern of short TTIs in the DwPTS based on the configuration of the special subframe having the normal CP used in downlink and based on the length of the control region in DwPTS, and may determine a division pattern of short TTIs in the UpPTS based on the configuration of the special subframe having the normal CP used in uplink. Thus, a short TTI with single-symbol data transmission is prevented from emerging, and a stability of data transmission is ensured. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

BRIEF DESCRIPTION OF THE DRAWINGS

FIG. 1 is a flowchart of a method for dividing short TTIs in a special subframe in some embodiments of the present disclosure;

FIG. 2 is a flowchart of a method for dividing short TTIs in a special subframe in some embodiments of the present disclosure;

FIG. 8 is a flowchart of a method for dividing short TTIs in a special subframe in some embodiments of the present disclosure;

FIG. 10 is a flowchart of a method for dividing short TTIs in a special subframe in some embodiments of the present disclosure;

FIG. 11 is a schematic diagram of another division pattern of short TTIs in a special subframe in some embodiments of the present disclosure;

DETAILED DESCRIPTION

Figure 3:
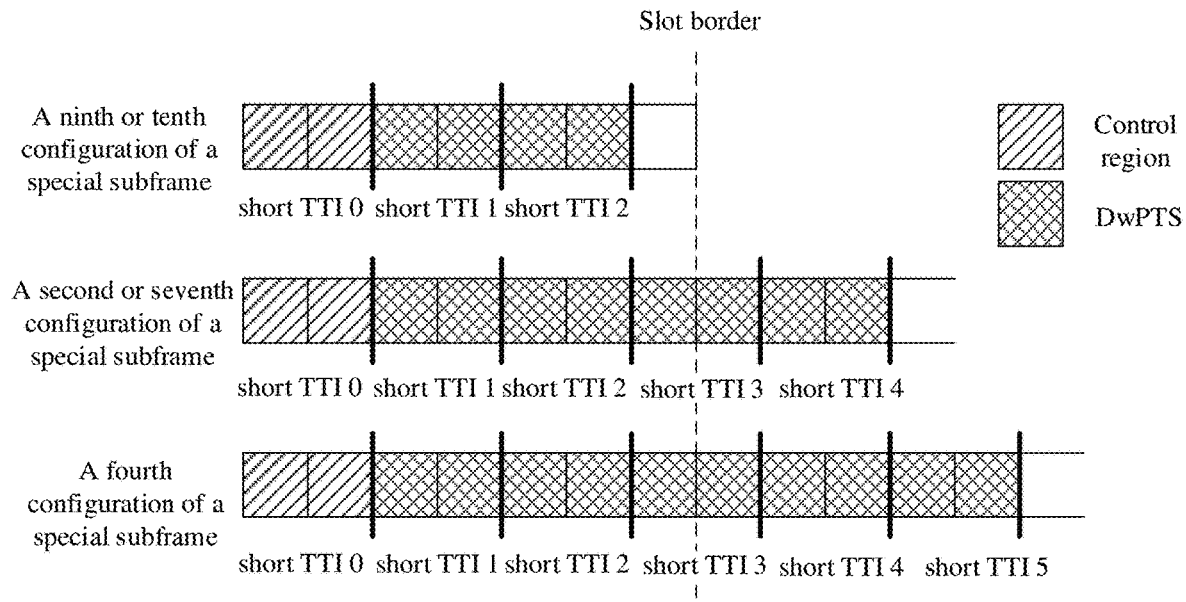
FIG. 3 is a schematic diagram of a division pattern of short TTIs in a special subframe in some embodiments of the present disclosure.

To make technical problems to be solved, technical solutions, and advantages of the present disclosure clearer, specific embodiments will be described hereinafter in details in combination with accompanying drawings.

In order to make one skilled in the art understand the present disclosure clearly, a special subframe mentioned in the embodiments of the present disclosure is introduced firstly.

The special subframe includes a DwPTS (Downlink Pilot Time Slot), a GP (Guard Period) and an UpPTS (Uplink Pilot Time Slot). Configurations of special subframes specified in a network protocol are shown in Table 1 below. Table 1 specifies configurations 0 to 10 of special subframes.

TABLE 1 configurations of special subframes.

| | Normal CP (Cyclic Prefix) used in downlink | | | Extended CP used in downlink | | |
|---|---|---|---|---|---|---|
| | | UpPTS | | | UpPTS | |
| Configurations of a special subframe | DwPTS | Normal CP used in uplink | Extended CP used in uplink | DwPTS | Normal CP used in uplink | Extended CP used in uplink |
| 0 | $6592 \cdot T_s$ three symbols | $(1 + X) \cdot 2192 \cdot T_s$ one symbol | $(1 + X) \cdot 2560 \cdot T_s$ one symbol | $7680 \cdot T_s$ three symbols | $(1 + X) \cdot 2192 \cdot T_s$ two symbols | $(1 + X) \cdot 2560 \cdot T_s$ two symbols |
| 1 | $19760 \cdot T_s$ nine symbols | | | $20480 \cdot T_s$ eight symbols | | |
| 2 | $21952 \cdot T_s$ ten symbols | | | $23040 \cdot T_s$ nine symbols | | |
| 3 | $24144 \cdot T_s$ eleven symbols | | | $25600 \cdot T_s$ ten symbols | | |
| 4 | $26336 \cdot T_s$ twelve symbols | | | $7680 \cdot T_s$ three symbols | $(2 + X) \cdot 2192 \cdot T_s$ two symbols | $(2 + X) \cdot 2560 \cdot T_s$ two symbols |
| 5 | $6592 \cdot T_s$ three symbols | $(2 + X) \cdot 2192 \cdot T_s$ two symbols | $(2 + X) \cdot 2560 \cdot T_s$ two symbols | $20480 \cdot T_s$ eight symbols | | |
| 6 | $19760 \cdot T_s$ nine symbols | | | $23040 \cdot T_s$ nine symbols | | |
| 7 | $21952 \cdot T_s$ ten symbols | | | $12800 \cdot T_s$ five symbols | | |
| 8 | $24144 \cdot T_s$ eleven symbols | | | — | — | — |

TABLE 1-continued configurations of special subframes.

| | Normal CP (Cyclic Prefix) used in downlink | | | Extended CP used in downlink | | |
|---|---|---|---|---|---|---|
| | | UpPTS | | | UpPTS | |
| Configurations of a special subframe | DwPTS | Normal CP used in uplink | Extended CP used in uplink | DwPTS | Normal CP used in uplink | Extended CP used in uplink |
| 9 | $13168 \cdot T_s$ six symbols | | | — | — | — |
| 10 | $13168 \cdot T_s$ six symbols | $13152 \cdot T_s$ six symbols | $12800 \cdot T_s$ five symbols | — | — | — |

Symbols occupied by the DwPTS and the UpPTS are OFDM symbols.

The method for dividing short TTIs in the special subframe provided in the embodiments of the present disclosure determines a solution of dividing short TTIs in the DwPTS based on configurations of special subframes having a normal cyclic prefix (CP) and a length of a control region in the DwPTS, may prevent a short TTI with single-symbol data transmission for emerging, and ensures a stability of data transmission.

In some embodiments of the present disclosure, referring to FIG. 1, some embodiments of the present disclosure provide a method for dividing short TTIs in a special subframe. This method includes a step 101.

Step 101: dividing short Transmission Time Intervals (TTIs) in a downlink pilot time slot (DwPTS) based on a predefined division pattern of short TTIs, in a case that a configuration of a special subframe having a normal cyclic prefix (CP) is used in downlink, and the DwPTS of the special subframe is used for a short TTI transmission, and in a case that based on the configuration of the special subframe having the normal CP used in downlink and based on a length of a control region in the DwPTS, the DwPTS is determined to satisfy a division condition corresponding to the predefined division pattern of short TTIs.

In this step, in a case that the configuration of the special subframe having the normal CP is used in downlink and the DwPTS is used for the short TTI transmission, the division pattern of short TTIs in the DwPTS is determined based on the configuration of the special subframe having the normal CP used in downlink and the length of the control region in the DwPTS.

For example, in a case that the configuration of the special subframe having the normal CP used in downlink is a second configuration, a fourth configuration, a seventh configuration, a ninth configuration or a tenth configuration specified in the network protocol, if the quantity of symbols occupied by the control region in the DwPTS is two, then in the division pattern of short TTIs in the DwPTS, a first short TTI in which the control region in the DwPTS is located is determined to occupy two symbols or four symbols, each of short TTIs other than the first short TTI occupies two symbols; if the quantity of symbols occupied by the control region in the DwPTS is one, then in the division pattern of short TTIs in the DwPTS, the first short TTI in which the control region in the DwPTS is located is determined to occupy one symbol or three symbols, a second short TTI occupies three symbols, and short TTIs other than the first short TTI and the second TTI occupy two symbols, or the first short TTI in the division pattern of short TTIs in the DwPTS is determined to occupy four symbols, and each of short TTIs other than the first short TTI occupies two symbols.

In a case that the configuration of a special subframe having the normal CP used in downlink is the first, the third, the sixth or the eighth configuration specified in the network protocol and the quantity of symbols occupied by the control region in the DwPTS is one or two, the first short TTI in the division pattern of short TTIs in the DwPTS is determined to occupy four symbols, the second short TTI occupies three symbols, and each of short TTIs other than the first short TTI and the second short TTI occupies two symbols.

In this way, a solution of dividing short TTIs in the DwPTS is determined based on configurations of special subframes having a normal cyclic prefix (CP) used in downlink and the quantity of symbols occupied by the control region in the DwPTS, and a short TTI with single-symbol data transmission is prevented from emerging, and a stability of data transmission is ensured.

The method for dividing short TTIs in the special subframe provided in the embodiments of the present disclosure determines a solution of dividing short TTIs in the DwPTS based on configurations of special subframes having a normal cyclic prefix (CP) used in downlink and a length of a control region in the DwPTS, and may prevent a short TTI with single-symbol data transmission, and ensures a stability of data transmission. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

In some embodiments of the present disclosure, the method for dividing short TTIs in a special subframe provided in the embodiments of the present disclosure is applied to a short-TTI division case in which the configuration of the special subframe having the normal CP used in downlink is the second configuration, the fourth configuration, the seventh configuration, the ninth configuration, or the tenth configuration specified in the network protocol, and the DwPTS in the special subframe is used the short-TTI transmission. The method provided in the embodiments of the present disclosure determines the division pattern of short TTIs in the DwPTS based on the configuration of the special subframe having the normal CP used in downlink and the quantity of symbols occupied by the control region in the DwPTS.

Referring to FIG. 2, some embodiments of the present disclosure provide a method for dividing short TTIs in a special subframe. This method includes steps 201-202.

Step 201: in a case that the configuration of a special subframe having the normal CP used in downlink is the second configuration, the fourth configuration, the seventh configuration, the ninth configuration, or the tenth configuration specified in the network protocol, and the quantity of symbols occupied by the control region in the DwPTS is two, determining that the DwPTS satisfies a division condition corresponding to a first division pattern of short TTIs defined in advance, and dividing short TTIs in the DwPTS based on the first division pattern of short TTIs, wherein, the first division pattern of short TTIs is a division pattern in which each of the short TTIs in the DwPTS occupies two symbols.

In this step, the configuration of a special subframe having the normal CP used in downlink is the second configuration, the fourth configuration, the seventh configuration, the ninth configuration or the tenth configuration specified in the network protocol, and the quantity of symbols occupied by the control region in the DwPTS is two, a uniform division pattern of short TTIs is used for the DwPTS, i.e., a division pattern in which each of the short TTIs in the DwPTS occupies two symbols, and a short TTI with single-symbol data transmission is prevented from emerging, and a stability of data transmission is ensured.

As shown in FIG. 3, in a case that the configuration of a special subframe having the normal CP used in downlink is the ninth configuration or the tenth configuration specified in the network protocol, a length of the DwPTS is configured to be six symbols, and after short TTIs in the DwPTS are divided based on the first division pattern of short TTIs, a division pattern of short TTIs in the DwPTS is as follows: the quantities of symbols occupied by the first short TTI to the last short TTI (a short TTI 0 to a short TTI 2) are 2, 2, 2, respectively, that is, a division pattern of short TTIs in the DwPTS is {2, 2, 2}.

In a case that the configuration of a special subframe having the normal CP used in downlink is the second configuration or the seventh configuration specified in the network protocol, a length of the DwPTS is configured to be ten symbols, after short TTIs in the DwPTS are divided based on the first division pattern of short TTIs, a division pattern of short TTIs in the DwPTS is as follows: the quantities of symbols occupied by the first short TTI to the last short TTI (a short TTI 0 to a short TTI 4) are 2, 2, 2, 2, 2, respectively, that is, a division pattern of short TTIs in the DwPTS is {2, 2, 2, 2, 2}.

In a case that the configuration of a special subframe having the normal CP used in downlink is the fourth configuration specified in the network protocol, the length of the DwPTS is configured to be twelve symbols, after short TTIs in the DwPTS are divided based on the first division pattern of short TTIs, a division pattern of short TTIs in the DwPTS is as follows: the quantities of symbols occupied by the first short TTI to the last short TTI (a short TTI 0 to a short TTI 5) are 2, 2, 2, 2, 2, 2, respectively, that is, a division pattern of short TTIs in the DwPTS is {2, 2, 2, 2, 2, 2}.

Step 202: in a case that the configuration of a special subframe having the normal CP used in downlink is the second configuration, the fourth configuration, the seventh configuration, the ninth configuration, or the tenth configuration specified in the network protocol, and the quantity of symbols occupied by the control region in the DwPTS is one, determining that the DwPTS satisfies a division condition corresponding to a second division pattern of short TTIs defined in advance, and dividing short TTIs in the DwPTS based on the second division pattern of short TTIs, wherein, the second division pattern of short TTIs is a division pattern in which the first short TTI occupies one symbol or three symbols, the second short TTI occupies three symbols, each of short TTIs other than the first short TTI and the second short TTI occupies two symbols; the first short TTI is a short TTI in which the control region in the DwPTS is located.

In this step, the configuration of a special subframe having the normal CP used in downlink is the second configuration, the fourth configuration, the seventh configuration, the ninth configuration or the tenth configuration specified in the network protocol, and the quantity of symbols occupied by the control region in the DwPTS is one, a uniform division pattern of short TTIs is used in the DwPTS, i.e., a division pattern in which the first short TTI occupies one symbol or three symbols, the second short TTI occupies three symbols, and each of short TTIs other than the first short TTI and the second short TTI occupies two symbols, and a short TTI with single-symbol data transmission is prevented from emerging, and a stability of data transmission is ensured.

The first short TTI is a first short TTI in the DwPTS, and the second short TTI is the last short TTI in the DwPTS.

Figure 4:
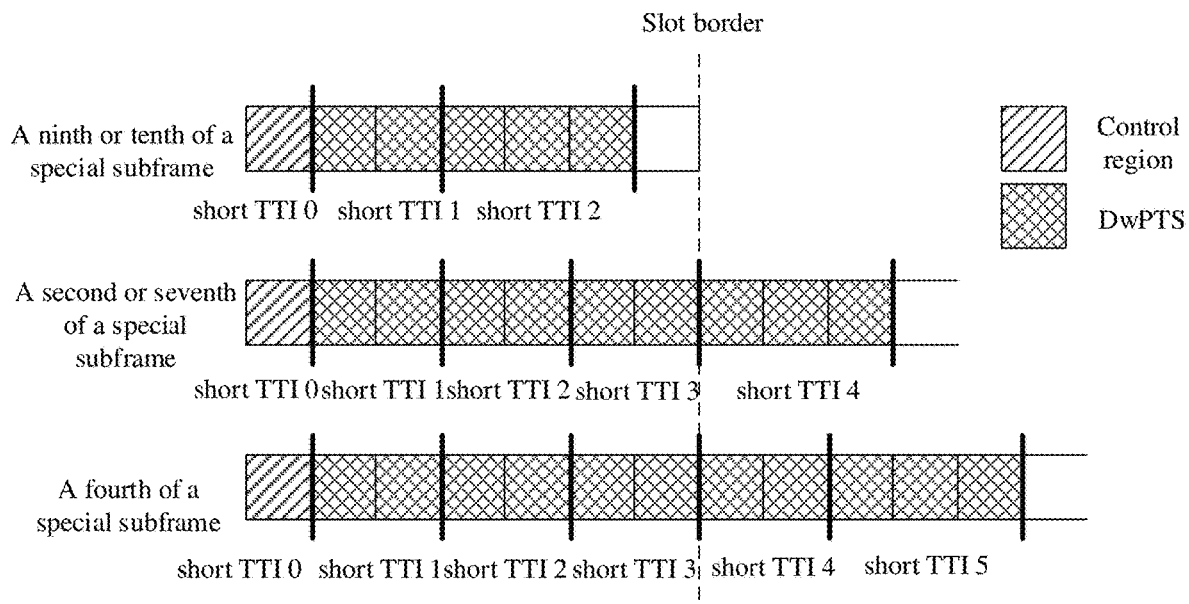
FIG. 4 is a schematic diagram of another division pattern of short TTIs in a special subframe in some embodiments of the present disclosure.
Figure 5:
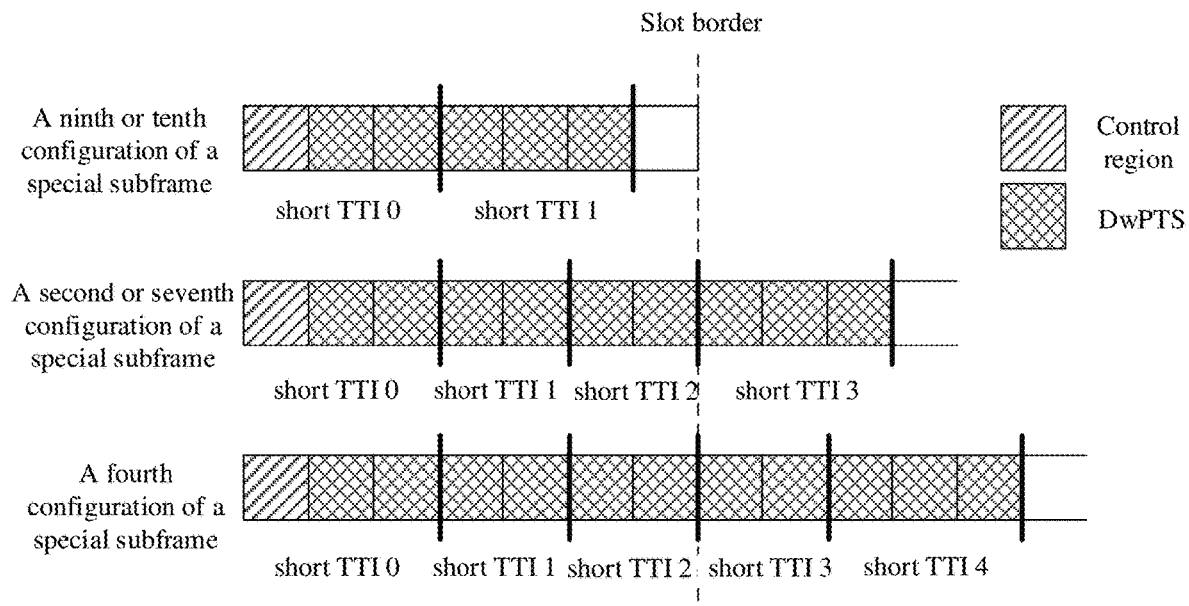
FIG. 5 is a schematic diagram of another division pattern of short TTIs in a special subframe in some embodiments of the present disclosure.

In a case that the configuration of a special subframe having the normal CP used in downlink is the ninth configuration or the tenth configuration specified in the network protocol, a length of the DwPTS is configured to be six symbols, after short TTIs in the DwPTS are divided based on the second division pattern of short TTIs, a division pattern of short TTIs in the DwPTS is as follows: the quantities of symbols occupied by the first short TTI to the last short TTI (a short TTI 0 to a short TTI 2) are 1, 2 3, respectively; or the quantities of symbols occupied by the first short TTI to the last short TTI (the short TTI 0 to the short TTI 1) are 3, 3, respectively, that is, a division pattern of short TTIs in the DwPTS is {1, 2, 3}, or {3, 3}, as shown in FIG. 4 and FIG. 5.

In a case that the configuration of a special subframe having the normal CP used in downlink is the second configuration or the seventh configuration specified in the network protocol, a length of the DwPTS is configured to be ten symbols, after short TTIs in the DwPTS are divided based on the second division pattern of short TTIs, a division pattern of short TTIs in the DwPTS is as follows: the quantities of symbols occupied by the first short TTI to the last short TTI (a short TTI 0 to a short TTI 4) are 1, 2, 2, 2, 3, respectively; or the quantities of symbols occupied by the first short TTI to the last short TTI (the short TTI 0 to the short TTI 3) are 3, 2, 2, 3, respectively, that is, a division pattern of short TTIs in the DwPTS is {1, 2, 2, 2, 3}, or {3, 2, 2, 3}, as shown in FIG. 4 and FIG. 5.

In a case that the configuration of a special subframe having the normal CP used in downlink is the fourth configuration specified in the network protocol, a length of the DwPTS is configured to be twelve symbols, and after short TTIs in the DwPTS are divided based on the second division pattern of short TTIs, a division pattern of short TTIs in the DwPTS is as follows: the quantities of symbols occupied by the first short TTI to the last short TTI (a short TTI 0 to a short TTI 5) are 1, 2, 2, 2, 2, 3, respectively; or the quantities of symbols occupied by the first short TTI to the last short TTI (the short TTI 0 to the short TTI 4) are 3, 2, 2, 2, 3, respectively, that is, a division pattern of short TTIs in the DwPTS is {1, 2, 2, 2, 2, 3}, or {3, 2, 2, 2, 3}, as shown in FIG. 4 and FIG. 5.

The method for dividing short TTIs in the special subframes provided in the embodiments of the present disclosure determines a solution of dividing short TTIs in the DwPTS based on configurations of special frames using a normal cyclic prefix (CP) and a length of a control region in the DwPTS, and may prevent a short TTI with single-symbol data transmission from emerging, and ensures a stability of data transmission. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

Different lengths of the DwPTSs are provided with a uniform division pattern of short TTIs hereinbefore. Different lengths of the DwPTS may also be provided with different division patterns of short TTIs.

If the quantity of symbols occupied by the control region in the DwPTS is two, some embodiments of the present disclosure provide a method for dividing short TTIs in a special subframe. This method includes steps 203-204.

Step 203: in a case that the configuration of a special subframe having the normal CP used in downlink is the second configuration, or the seventh configuration specified in the network protocol, and the quantity of symbols occupied by the control region in the DwPTS is two, determining that the DwPTS satisfies a division condition corresponding to a fifth division pattern of short TTIs defined in advance, and dividing short TTIs in the DwPTS based on the fifth division pattern of short TTIs, wherein, the fifth division pattern of short TTIs is a division pattern in which the quantities of symbols occupied by the first short TTI to the last short TTI are 2, 3, 2, 3, respectively.

Figure 6:
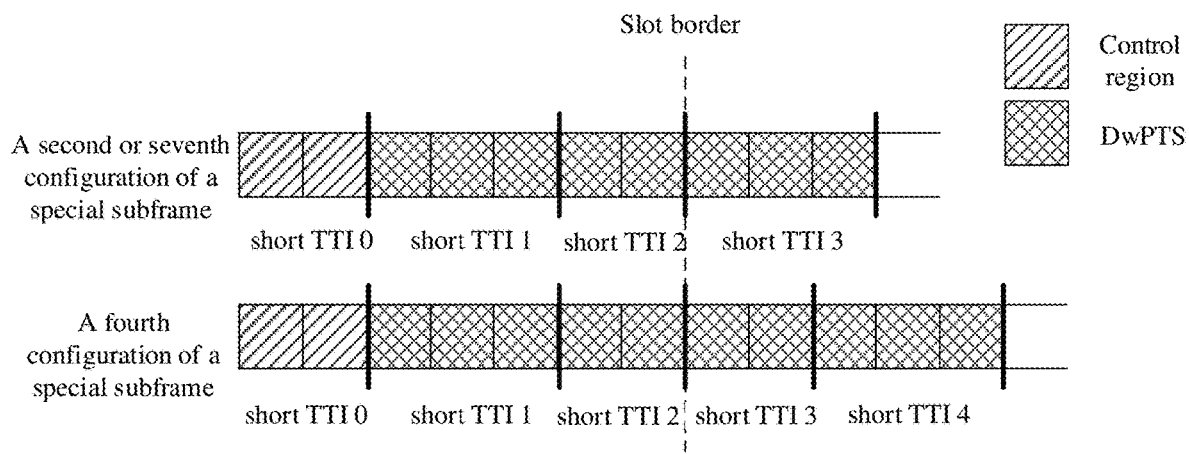
FIG. 6 is a schematic diagram of another division pattern of short TTIs in a special subframe in some embodiments of the present disclosure.

In a case that the configuration of a special subframe having the normal CP used in downlink is the second configuration or the seventh configuration specified in the network protocol, a length of the DwPTS is configured to be ten symbols, and after short TTIs in the DwPTS are divided based on the fifth division pattern of short TTIs, a division pattern of short TTIs in the DwPTS is as follows: the quantities of symbols occupied by the first short TTI to the last short TTI (a short TTI 0 to a short TTI 3) are 2, 3, 2, 3, respectively, that is, a division pattern of short TTIs in the DwPTS is {2, 3, 2, 3}, as shown in FIG. 6.

Step 204: in a case that the configuration of a special subframe having the normal CP used in downlink is the fourth configuration specified in the network protocol, and the quantity of symbols occupied by the control region in the DwPTS is two, determining that the DwPTS satisfies a division condition corresponding to a sixth division pattern of short TTIs defined in advance, and dividing short TTIs in the DwPTS based on the sixth division pattern of short TTIs, wherein, the sixth division pattern of short TTIs is a division pattern in which the quantities of symbols occupied by the first short TTI to the last short TTI are 2, 3, 2, 2, 3, respectively, or 2, 3, 2, 3, 2, respectively.

In a case that the configuration of a special subframe having the normal CP used in downlink is the fourth configuration specified in the network protocol, a length of the DwPTS is configured to be twelve symbols, and after short TTIs in the DwPTS are divided based on the sixth division pattern of short TTIs, a division pattern of short TTIs in the DwPTS is as follows: the quantities of symbols occupied by the first short TTI to the last short TTI (a short TTI 0 to a short TTI 4) are 2, 3, 2, 2, 3, respectively, or 2, 3, 2, 3, 2, respectively, that is, a division pattern of short TTIs in the DwPTS is {2, 3, 2, 2, 3} or {2, 3, 2, 3, 2}, as shown in FIG. 6.

If the quantity of symbols occupied by the control region in the DwPTS is one, some embodiments of the present disclosure provide a method for dividing short TTIs in a special subframe. This method includes following steps 205-207.

Step 205: in a case that the configuration of a special subframe having the normal CP used in downlink is the ninth configuration, or the tenth configuration specified in the network protocol, and the quantity of symbols occupied by the control region in the DwPTS is one, determining that the DwPTS satisfies a division condition corresponding to a seventh division pattern of short TTIs defined in advance, and dividing short TTIs in the DwPTS based on the seventh division pattern of short TTIs, wherein, the seventh division pattern of short TTIs is a division pattern in which the quantities of symbols occupied by the first short TTI to the last short TTI are 1, 3, 2, respectively.

Figure 7:
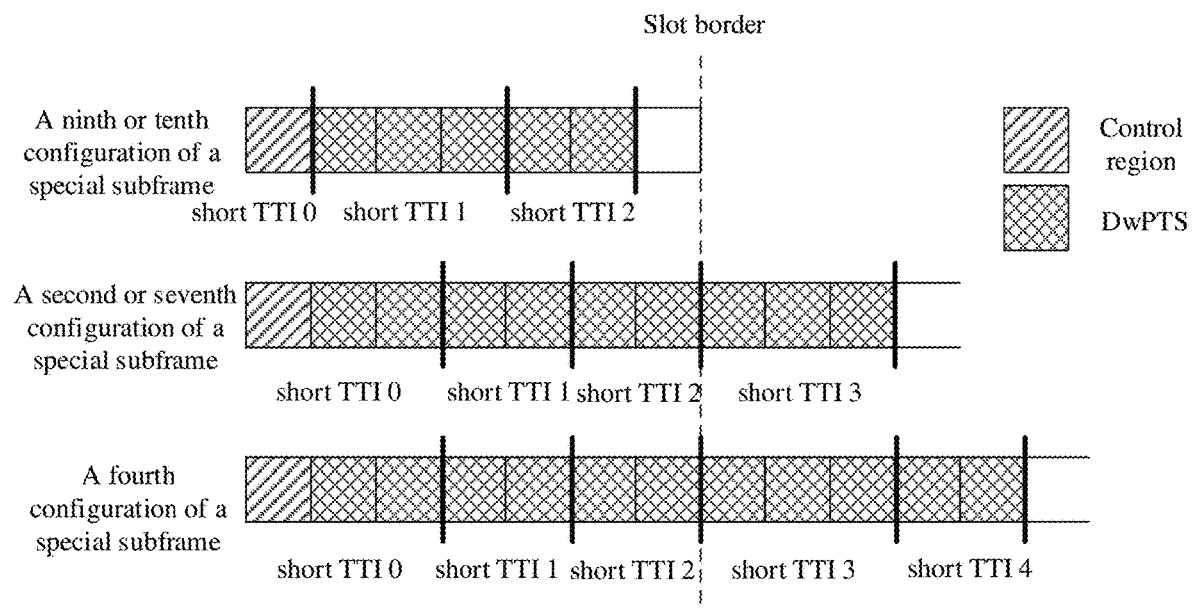
FIG. 7 is a schematic diagram of another division pattern of short TTIs in a special subframe in some embodiments of the present disclosure.

In a case that the configuration of a special subframe having the normal CP used in downlink is the ninth configuration or the tenth configuration specified in the network protocol, a length of the DwPTS is configured to be six symbols, and after short TTIs in the DwPTS are divided based on the seventh division pattern of short TTIs, a division pattern of short TTIs in the DwPTS is as follows: the quantities of symbols occupied by the first short TTI to the last short TTI (a short TTI 0 to a short TTI 2) are 1, 3, 2, respectively, that is, a division pattern of short TTIs in the DwPTS is {1, 3, 2}, as shown in FIG. 7.

Step 206: in a case that the configuration of a special subframe having the normal CP used in downlink is the second configuration, or the seventh configuration specified in the network protocol, and the quantity of symbols occupied by the control region in the DwPTS is one, determining that the DwPTS satisfies a division condition corresponding to an eighth division pattern of short TTIs defined in advance, and dividing short TTIs in the DwPTS based on the eighth division pattern of short TTIs, wherein, the eighth division pattern of short TTIs is a division pattern in which the quantities of symbols occupied by the first short TTI to the last short TTI are 3, 2, 2, 3, respectively.

In a case that the configuration of a special subframe having the normal CP used in downlink is the second configuration or the seventh configuration specified in the network protocol, a length of the DwPTS is configured to be ten symbols, and after short TTIs in the DwPTS are divided based on the eighth division pattern of short TTIs, a division pattern of short TTIs in the DwPTS is as follows: the quantities of symbols occupied by the first short TTI to the last short TTI (a short TTI 0 to a short TTI 3) are 3, 2, 2, 3, respectively, that is, a division pattern of short TTIs in the DwPTS is {3, 2, 2, 3}, as shown in FIG. 7.

Step 207: in a case that the configuration of a special subframe having the normal CP used in downlink is the fourth configuration specified in the network protocol, and the quantity of symbols occupied by the control region in the DwPTS is one, determining that the DwPTS satisfies a division condition corresponding to a ninth division pattern of short TTIs defined in advance, and dividing short TTIs in the DwPTS based on the ninth division pattern of short TTIs, wherein, the ninth division pattern of short TTIs is a division pattern in which the quantities of symbols occupied by the first short TTI to the last short TTI are 3, 2, 2, 2, 3, respectively, or 3, 2, 2, 3, 2, respectively.

In a case that the configuration of a special subframe having the normal CP used in downlink is the fourth configuration specified in the network protocol, a length of the DwPTS is configured to be twelve symbols, and after short TTIs in the DwPTS are divided based on the ninth division pattern of short TTIs, a division pattern of short TTIs in the DwPTS is as follows: the quantities of symbols occupied by the first short TTI to the last short TTI (a short TTI 0 to a short TTI 4) are 3, 2, 2, 2, 3, respectively, or 3, 2, 2, 3, 2, respectively, that is, a division pattern of short TTIs in the DwPTS is {3, 2, 2, 2, 3} or {3, 2, 2, 3, 2}, as shown in FIG. 7.

In the embodiments, a non-uniform division pattern of short TTIs in the DwPTS is determined based on a configuration of a special subframe having a normal cyclic prefix (CP) and a length of a control region in the DwPTS, and a short TTI with single-symbol data transmission is prevented from emerging, and a stability of data transmission is ensured.

The method for dividing short TTIs in the special subframe provided in the embodiments of the present disclosure determines a solution of dividing short TTIs in the DwPTS based on the configuration of a special subframe having a normal cyclic prefix (CP) in downlink and a length of a control region in the DwPTS, and may prevent a short TTI with single-symbol data transmission from emerging, and ensures a stability of data transmission. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

In some embodiments of the present disclosure, the method for dividing short TTIs in a special subframe provided in the embodiments of the present disclosure is applied to a short-TTI division case in which the configuration of the special subframe having the normal CP used in downlink is the second configuration, the fourth configuration, the seventh configuration, the ninth configuration, or the tenth configuration specified in the network protocol, and the DwPTS in the special subframe is used for the short-TTI transmission. The method provided in the embodiments of the present disclosure determines the division pattern of short TTIs in the DwPTS based on the configuration of the special subframe having the normal CP used in downlink and the quantity of symbols occupied by the control region.

Referring to FIG. 8, some embodiments of the present disclosure provide a method for dividing short TTIs in a special subframe. This method includes following steps 801-802.

Step 801: in a case that the configuration of a special subframe having the normal CP used in downlink is the second configuration, the fourth configuration, the seventh configuration, the ninth configuration, or the tenth configuration specified in the network protocol, and the quantity of symbols occupied by the control region in the DwPTS is one or two, determining that the DwPTS satisfies a division condition corresponding to a third division pattern of short TTIs defined in advance, and dividing short TTIs in the DwPTS based on the third division pattern of short TTIs, wherein, the third division pattern of short TTIs is a division pattern in which the first short TTI occupies four symbols, the second short TTI occupies two symbols, each of short TTIs other than the first short TTI and the second short TTI occupies two symbols; the first short TTI is a short TTI in which the control region in the DwPTS is located.

In this step, the configuration of a special subframe having the normal CP used in downlink is the second configuration, the fourth configuration, the seventh configuration, the ninth configuration or the tenth configuration specified in the network protocol, a length of the DwPTS is configured to be six symbols, ten symbols or twelve symbols, and the quantity of symbols occupied by the control region in the DwPTS is one or two, a uniform division pattern of short TTIs is used for the DwPTS, i.e., a division pattern in which the first short TTI occupies four symbols, the second short TTI occupies two symbols, and each of short TTIs other than the first short TTI and the second short TTI occupies two symbols, and a short TTI with single-symbol data transmission is prevented from emerging, and a stability of data transmission is ensured.

The first short TTI is a first short TTI in the DwPTS, and the second short TTI is the last short TTI in the DwPTS.

Figure 9:
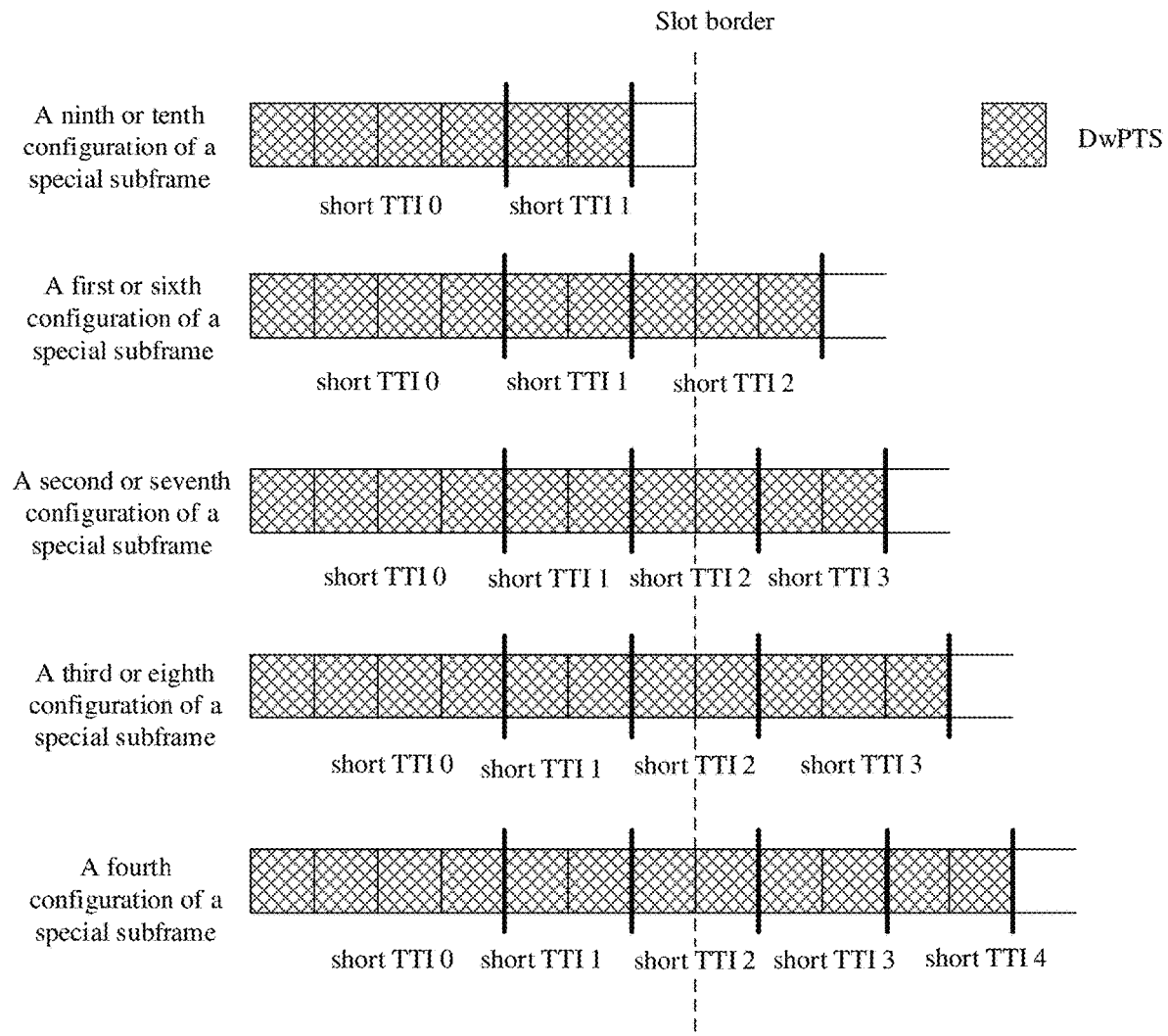
FIG. 9 is a schematic diagram of another division pattern of short TTIs in a special subframe in some embodiments of the present disclosure.

In a case that the configuration of a special subframe having the normal CP used in downlink is the ninth configuration or the tenth configuration specified in the network protocol, a length of the DwPTS is configured to be six symbols, and after short TTIs in the DwPTS are divided based on the third division pattern of short TTIs, a division pattern of short TTIs in the DwPTS is as follows: the quantities of symbols occupied by the first short TTI to the last short TTI (a short TTI 0 to a short TTI 1) are 4, 2, respectively, that is, a division pattern of short TTIs in the DwPTS is {4, 2}, as shown in FIG. 9.

In a case that the configuration of a special subframe having the normal CP used in downlink is the second configuration or the seventh configuration specified in the network protocol, a length of the DwPTS is configured to be ten symbols, and after short TTIs in the DwPTS are divided based on the third division pattern of short TTIs, a division pattern of short TTIs in the DwPTS is as follows: the quantities of symbols occupied by the first short TTI to the last short TTI (a short TTI 0 to a short TTI 3) are 4, 2, 2, 2 respectively, that is, a division pattern of short TTIs in the DwPTS is {4, 2, 2, 2}, as shown in FIG. 9.

In a case that the configuration of a special subframe having the normal CP used in downlink is the fourth configuration specified in the network protocol, a length of the DwPTS is configured to be twelve symbols, and after short TTIs in the DwPTS are divided based on the third division pattern of short TTIs, a division pattern of short TTIs in the DwPTS is as follows: the quantities of symbols occupied by the first short TTI to the last short TTI (a short TTI 0 to a short TTI 4) are 4, 2, 2, 2, 2, respectively, that is, a division pattern of short TTIs in the DwPTS is {4, 2, 2, 2, 2}, as shown in FIG. 9.

Step 802: in a case that the configuration of a special subframe having the normal CP used in downlink is the first configuration, the third configuration, the sixth configuration, or the eighth configuration specified in the network protocol, and the quantity of symbols occupied by the control region in the DwPTS is one or two, determining that the DwPTS satisfies a division condition corresponding to a fourth division pattern of short TTIs defined in advance, and dividing short TTIs in the DwPTS based on the fourth division pattern of short TTIs, wherein, the fourth division pattern of short TTIs is a division pattern in which the first short TTI occupies four symbols, the second short TTI occupies three symbols, each of short TTIs other than the first short TTI and the second short TTI occupies two symbols; the first short TTI is a short TTI in which the control region in the DwPTS is located.

In this step, the configuration of a special subframe having the normal CP used in downlink is the first configuration, the third configuration, the sixth configuration, or the eighth configuration specified in the network protocol, a length of the DwPTS is configured to be nine symbols or eleven symbols, and the quantity of symbols occupied by the control region in the DwPTS is one or two, a uniform division pattern of short TTIs is used for the DwPTS, i.e., a division pattern in which the first short TTI occupies four symbols, the second short TTI occupies three symbols, and each of short TTIs other than the first short TTI and the second short TTI occupies two symbols, and a short TTI with single-symbol data transmission is prevented from emerging, and a stability of data transmission is ensured.

The first short TTI is a first short TTI in the DwPTS, and the second short TTI is the last short TTI in the DwPTS.

In a case that the configuration of a special subframe having the normal CP used in downlink is the first configuration or the sixth configuration specified in the network protocol, a length of the DwPTS is configured to be nine symbols, and after short TTIs in the DwPTS are divided based on the fourth division pattern of short TTIs, a division pattern of short TTIs in the DwPTS is as follows: the quantities of symbols occupied by the first short TTI to the last short TTI (a short TTI 0 to a short TTI 2) are 4, 2, 3, respectively, that is, a division pattern of short TTIs in the DwPTS is {4, 2, 3}, as shown in FIG. 9.

In a case that the configuration of a special subframe having the normal CP used in downlink is the third configuration or the eighth configuration specified in the network protocol, a length of the DwPTS is configured to be eleven symbols, and after short TTIs in the DwPTS are divided based on the fourth division pattern of short TTIs, a division pattern of short TTIs in the DwPTS is as follows: the quantities of symbols occupied by the first short TTI to the last short TTI (a short TTI 0 to a short TTI 3) are 4, 2, 2, 3, respectively, that is, a division pattern of short TTIs in the DwPTS is {4, 2, 2, 3}, as shown in FIG. 9.

In a case that the configuration of a special subframe having the normal CP used in downlink is the first configuration, the third configuration, the sixth configuration, or the eighth configuration specified in the network protocol and a length of the DwPTS is configured to be nine symbols or eleven symbols, short TTIs in the DwPTS may also be divided based on an existing division pattern of short TTIs, i.e., in a case that the control region in the DwPTS occupies two symbols, a division pattern {3, 2, 2, 2, 2} of short TTIs is used; in a case that the control region in the DwPTS occupies one symbol, a division pattern {2, 3, 2, 2, 2} of short TTIs is used.

The method for dividing short TTIs in a special subframe provided in the embodiments of the present disclosure determines a solution of dividing short TTIs in the DwPTS based on the configuration of a special subframe having a normal cyclic prefix (CP) used in downlink and a length of a control region in the DwPTS, and may prevent a short TTI with single-symbol data transmission from emerging, and ensures a stability of data transmission. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

In some optional embodiments, referring to FIG. 10, the method for dividing short TTIs in a special subframe provided in the embodiments of the present disclosure includes a step 1001.

Step 1001: in a case that a configuration of a special subframe having a normal cyclic prefix (CP) is used in downlink, and a Downlink Pilot Time slot (DwPTS) of the special subframe is used for short Transmission Time Interval (TTI) transmission, and in a case that based on the configuration of the special subframe having the normal CP used in downlink and based on a length of a control region in the DwPTS, the DwPTS is determined to satisfy a division condition corresponding to a predefined division pattern of short TTIs, dividing the short TTI in the DwPTS based on the predefined division pattern of short TTIs.

In this step, in a case that the configuration of the special subframe having the normal CP is used in downlink, and the DwPTS is used for the short TTI transmission, the division pattern of short TTIs in the DwPTS is determined based on the configuration of the special subframe having the normal CP used in downlink and the length of the control region in the DwPTS.

For example, in a case that the configuration of the special subframe having the normal CP used in downlink is the second configuration, the fourth configuration, the seventh configuration, the ninth configuration or the tenth configuration specified in the network protocol, and in a case that the quantity of symbols occupied by the control region in the DwPTS is 2, it may be determined that, in the division pattern of short TTIs in the DwPTS, a first short TTI in which the control region in the DwPTS is located occupies two symbols or four symbols, each of short TTIs other than the first short TTI occupies two symbols. In a case the quantity of symbols occupied by the control region in the DwPTS is one, it may be determined that, in the division pattern of short TTIs in the DwPTS, the first short TTI in which the control region in the DwPTS is located occupies one symbol or three symbols, a second short TTI occupies three symbols, and each of short TTIs other than the first short TTI and the second TTI occupies two symbols, or it may be determined that in the division pattern of short TTIs in the DwPTS, the first short TTI occupies four symbols, and each of short TTIs other than the first short TTI occupies two symbols.

In a case that the configuration of a special subframe having the normal CP used in downlink is the first configuration, the third configuration, the sixth configuration, or the eighth configuration specified in the network protocol and the quantity of symbols occupied by the control region in the DwPTS is one or two, it may be determined that, in the division pattern of short TTIs in the DwPTS, the first short TTI occupies four symbols, the second short TTI occupies three symbols, and each of short TTIs other than the first short TTI and the second short TTI occupies two symbols.

In this way, a solution of dividing short TTIs in the DwPTS is determined based on configurations of special frames having a normal cyclic prefix (CP) used in downlink and the quantity of symbols occupied by the control region in the DwPTS, and a short TTI with single-symbol data transmission is prevented from emerging, and a stability of data transmission is ensured.

In a case that short-TTI transmission needs to be performed in the UpPTS in the special subframe, a current division pattern of short TTIs may cause emergency of a short TTI with single-symbol data transmission. To address this problem, some embodiments of the present disclosure provide a method for dividing short TTIs in a special subframe. This method includes a step 1002.

Step 1002: in a case that a configuration of a special subframe having a normal CP is used in uplink and an Uplink Pilot Time Slot (UpPTS) of the special subframe is used for short-TTI transmission, and in a case that the configuration of the special subframe having the normal CP used in uplink is the tenth configuration specified in the network protocol, dividing short TTIs in the UpPTS based on a pattern in which the quantities of symbols occupied by a first short TTI to the last short TTI are 2, 2, 2, respectively, or 3, 3, respectively, or 4, 2, respectively.

In this step, the configuration of the special subframe having the normal CP used in uplink is the tenth configuration specified in the network protocol, and a length of the UpPTS is configured to be six symbols, a division pattern of short TTIs in the UpPTS is {2, 2, 2} or {3, 3} or {4, 2}.

For example, each of configurations of special frames having the normal CP used in uplink and in downlink is the tenth configuration specified in the network protocol, and a length of the UpPTS is configured to be six symbols, the Guard Period (GP) occupies two symbols, and the UpPTS occupies six symbols. In a case that the DwPTS in a subframe is not used for the short-TTI transmission, but the UpPTS in the same subframe is used for the short-TTI transmission, the division pattern of short TTIs in the UpPTS may be a division pattern in which the quantities of symbols occupied by the first short TTI to the last short TTI (a short TTI 0 to a short TTI 2) are 2, 2, 2, respectively, as shown in FIG. 11.

In the embodiments, the division pattern of short TTIs in the UpPTS is determined based on the configuration of a special subframe having a normal cyclic prefix (CP) used in uplink, and a short TTI with single-symbol data transmission is prevented from emerging, and a stability of data transmission is ensured.

The method for dividing short TTIs in the special subframe provided in the embodiments of the present disclosure may determine a solution of dividing short TTIs in the DwPTS based on the configuration of a special subframe having a normal cyclic prefix (CP) used in downlink and a length of a control region in the DwPTS, and may also determine a solution of dividing short TTIs in the UpPTS based on the configuration of a special subframe having the normal CP used in uplink, and may prevent a short TTI with single-symbol data transmission from emerging, and ensures a stability of data transmission. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

In some optional embodiments, in a case that configurations of special frames having the normal CP are used in uplink and in downlink, respectively, and both the DwPTS and the UpPTS in the same special subframe are used for the short-TTI transmission, the method for dividing short TTIs in the special subframe provided in the embodiments of the present disclosure further includes a step 1003 to a step 1004.

Step 1003: in a case that each of configurations of special frames having the normal CP used in uplink and in downlink is the ninth configuration or the tenth configuration specified in the network protocol, and the quantity of symbols occupied by the control region in the DwPTS is two, dividing short TTIs in the special subframe based on a pattern in which the quantities of symbols occupied by the first short TTI to the last short TTI are 2, 2, 2, 2, 2, 2, 2, respectively, or 2, 2, 2, 3, 3, 2, respectively, or 2, 2, 2, 2, 4, 2, respectively, or 2, 2, 2, 2, 2, 4, respectively.

In a case, each of the configuration of the special subframe having the normal CP used in uplink and in downlink is the ninth configuration or the tenth configuration specified in the network protocol, and the quantity of symbols occupied by the control region in the DwPTS is two, the division pattern of short TTIs in the entirety of the special subframe is {2, 2, 2, 2, 2, 2, 2} or {2, 2, 2, 3, 3, 2}, or {2, 2, 2, 2, 4, 2}, or {2, 2, 2, 2, 2, 4}.

Step 1004: in a case that each of the configurations of special frames having the normal CP used in uplink and in downlink is the ninth configuration or the tenth configuration specified in the network protocol, and the quantity of symbols occupied by the control region in the DwPTS is one, dividing short TTIs in the special subframe based on a pattern in which the quantities of symbols occupied by the first short TTI to the last short TTI are 3, 3, 2, 3, 3, respectively, or 3, 3, 2, 2, 2, 2, respectively, or 3, 3, 2, 2, 4, respectively, or 3, 3, 2, 4, 2, respectively.

In a case that each of the configurations of special frames having the normal CP used in uplink and in downlink is the ninth configuration or the tenth configuration specified in the network protocol, and the quantity of symbols occupied by the control region in the DwPTS is one, a division pattern of short TTIs in the entirety of the special subframe is {3, 3, 2, 3, 3} or {3, 3, 2, 2, 2, 2}, or {3, 3, 2, 2, 4}, or {3, 3, 2, 4, 2}.

In some optional embodiments, in a case that the configurations of special frames having the normal CP are used in uplink and in downlink, respectively, and both the DwPTS and the UpPTS in a same special subframe are used for the short-TTI transmission, the method for dividing short TTIs in the special subframe provided in the embodiments of the present disclosure further includes a step 1005.

Step 1005: in a case that each of the configurations of special frames having the normal CP used in uplink and in downlink is the ninth configuration or the tenth configuration specified in the network protocol, and the quantity of symbols occupied by the control region in the DwPTS is one or two, dividing short TTIs in the special subframe based on a pattern in which the quantities of symbols occupied by the first short TTI to the last short TTI are 4, 2, 2, 2, 2, 2, respectively, or 4, 2, 2, 4, 2, respectively, or 4, 2, 2, 2, 4, respectively, or 4, 2, 2, 3, 3, respectively.

In a case that each of the configurations of special frames having the normal CP used in uplink and in downlink is the ninth configuration or the tenth configuration, and the quantity of symbols occupied by the control region in the DwPTS is one or two, the division pattern of short TTIs in the entirety of the special subframe is {4, 2, 2, 2, 2, 2} or {4, 2, 2, 4, 2}, or {4, 2, 2, 2, 4}, or {4, 2, 2, 3, 3}.

In some optional embodiments, in a case that configurations of special frames having the normal CP are used both in uplink and in downlink, and both the DwPTS and the UpPTS in the same special subframe are used for the short-TTI transmission, the method for dividing short TTIs in the special subframe provided in the embodiments of the present disclosure further includes steps 1006-1007.

Step 1006: in a case that each of the configurations of special frames having the normal CP used in uplink and in downlink is the second configuration, the fourth configuration, or the seventh configuration, and the quantity of symbols occupied by the control region in the DwPTS is two, dividing short TTIs in the special subframe based on a pattern in which the quantities of symbols occupied by the first short TTI to the last short TTI are 2, 3, 2, 3, 2, 2 respectively.

In a case that each of the configurations of special frames having the normal CP used in uplink and in downlink is the second configuration, the fourth configuration, or the seventh configuration, and the quantity of symbols occupied by the control region in the DwPTS is two, the division pattern of short TTIs in the entirety of the special subframe is {2, 3, 2, 3, 2, 2}.

Step 1007: in a case that each of the configurations of special frames having the normal CP used in uplink and in downlink is the second configuration, the fourth configuration, or the seventh configuration, and the quantity of symbols occupied by the control region in the DwPTS is one, dividing short TTIs in the special subframe based on a pattern in which the quantities of symbols occupied by the first short TTI to the last short TTI are 3, 2, 2, 3, 2, 2 respectively.

In a case that each of the configurations of special frames having the normal CP used in uplink and in downlink is the second configuration, the fourth configuration, or the seventh configuration, and the quantity of symbols occupied by the control region in the DwPTS is one, the division pattern of short TTIs in the entirety of the special subframe is {3, 2, 2, 3, 2, 2}.

In some optional embodiments, in a case that the configurations of special frames having the normal CP are used in uplink and in downlink, respectively, and both the DwPTS and the UpPTS in the same special subframe are used for the short-TTI transmission, the method for dividing short TTIs in the special subframe provided in the embodiments of the present disclosure further includes steps 1008 and 1009.

Step 1008: in a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is two, dividing short TTIs in the special subframe based on a pattern in which the quantities of symbols occupied by the first short TTI to the last short TTI are 2, 3, 2, 2, 2, 3 respectively.

In a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is two, the division pattern of short TTIs in the entirety of the special subframe is {2, 3, 2, 2, 2, 3}.

Step 1009: in a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is one, dividing short TTIs in the special subframe based on a pattern in which the quantities of symbols occupied by the first short TTI to the last short TTI are 3, 2, 2, 2, 2, 3, respectively.

In a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is one, the division pattern of short TTIs in the entirety of the special subframe is {3, 2, 2, 2, 2, 3}.

In the embodiments, the division pattern of short TTIs of the entirety of the special subframe is determined based on configurations of special frames having the normal CP used in uplink and in downlink, and a short TTI with single-symbol data transmission is prevented from emerging, and a stability of data transmission is ensured.

For example, in a case that configurations of special frames having the normal CP are used in uplink and in downlink, respectively, and both the DwPTS and the UpPTS in the same special subframe are used for the short-TTI transmission, and if the control region occupies one symbol. In a case that the configuration of the special subframe is the ninth configuration (a length of the DwPTS is configured as six symbols, a length of the GP is configured as six symbols, and a length of the UpPTS is configured as two symbols) or the tenth configuration (a length of the DwPTS is configured as six symbols, a length of the GP is configured as two symbols, and a length of the UpPTS is configured as six symbols), a division pattern of short TTIs in the special subframe may be a division pattern in which the quantities of symbols occupied by the first short TTI to the last TTI (a short TTI 0 to a short TTI 4) are 3, 3, 2, 3, 3, respectively, as shown in FIG. 12.

Figure 12:
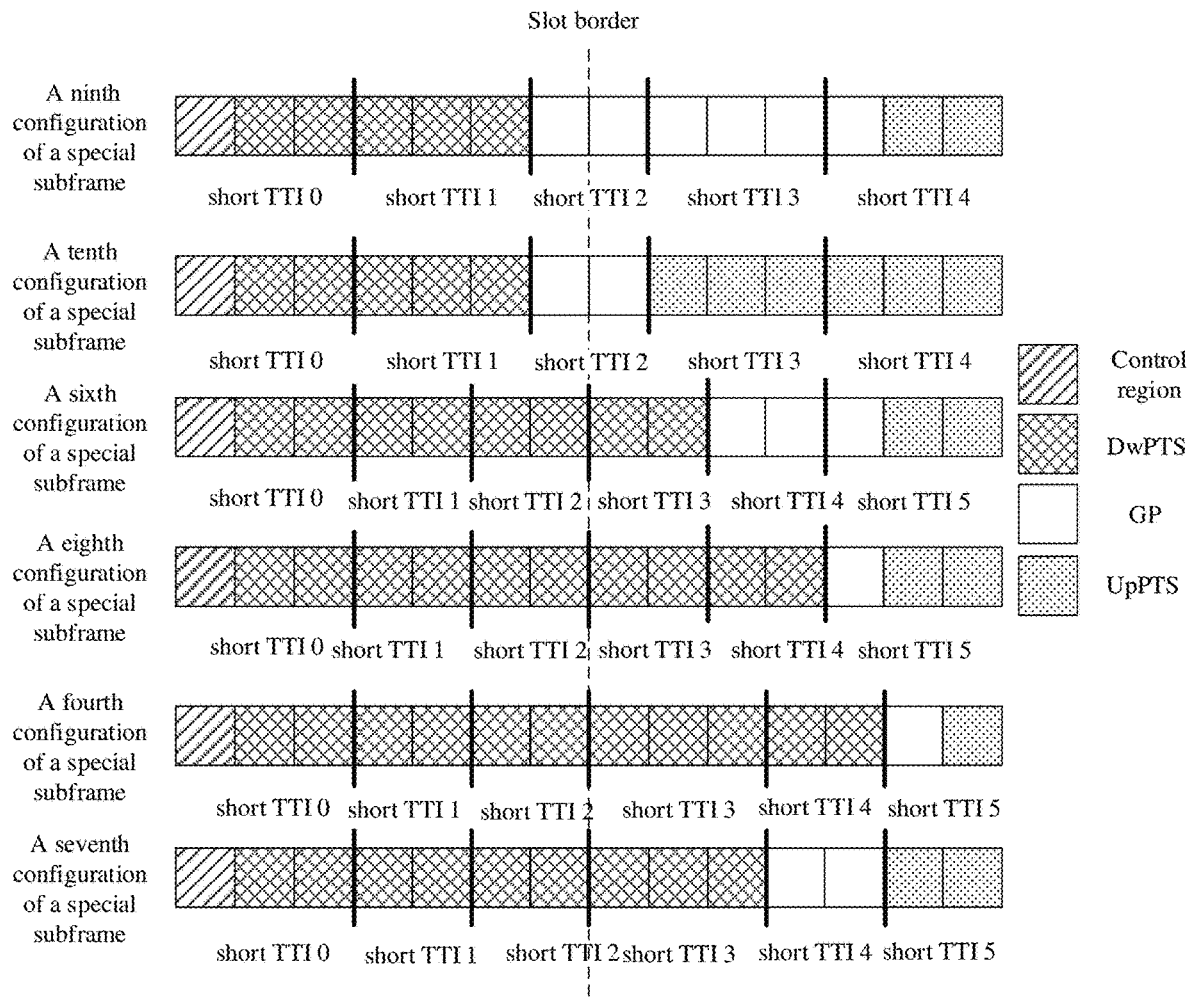
FIG. 12 is a schematic diagram of another division pattern of short TTIs in a special subframe in some embodiments of the present disclosure.

In a case that the configuration of the special subframe is the sixth configuration (a length of the DwPTS is configured as nine symbols, a length of the GP is configured as three symbols, and a length of the UpPTS is configured as two symbols) or the eighth configuration (a length of the DwPTS is configured as eleven symbols, a length of the GP is configured as one symbol, and a length of the UpPTS is configured as two symbols), a division pattern of short TTIs in the special subframe may be a division pattern in which the quantities of symbols occupied by the first short TTI to the last TTI (a short TTI 0 to a short TTI 5) are 3, 2, 2, 2, 2, 3, respectively, as shown in FIG. 12.

In a case that the configuration of the special subframe is the fourth configuration (a length of the DwPTS is configured as twelve symbols, a length of the GP is configured as one symbol, and a length of the UpPTS is configured as one symbol) or the seventh configuration (a length of the DwPTS is configured as ten symbols, a length of the GP is configured as two symbols, and a length of the UpPTS is configured as two symbols), a division pattern of short TTIs in the special subframe may be a division pattern in which the quantities of symbols occupied by the first short TTI to the last TTI (a short TTI 0 to a short TTI 5) are 3, 2, 2, 3, 2, 2, respectively, as shown in FIG. 12.

The method for dividing short TTIs in the special subframe provided in the embodiments of the present disclosure may determine a solution of dividing short TTIs in the DwPTS based on configurations of special frames having a normal cyclic prefix (CP) used in downlink and a length of a control region in the DwPTS, and may determine a solution of dividing short TTIs in the UpPTS based on the configurations of special frames having the normal CP used in uplink, and may prevent a short TTI with single-symbol data transmission from emerging, and ensures a stability of data transmission. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

Figure 13:
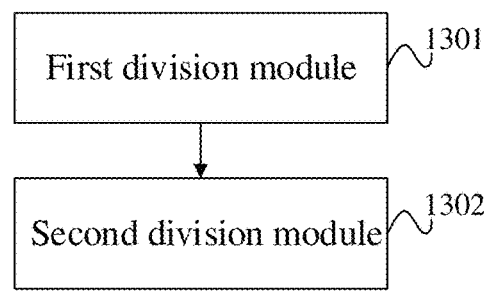
FIG. 13 is a structural schematic diagram of a device for dividing short TTIs in a special subframe in some embodiments of the present disclosure.

In some embodiments, referring to FIG. 13, some embodiments of the present disclosure provide a device for dividing short TTIs in a special subframe. The device includes a first division module 1301, configured to in a case that a configuration of a special subframe having a normal cyclic prefix (CP) is used in downlink, and a Downlink Pilot Time slot (DwPTS) of the special subframe is used for a short Transmission Time Interval (TTI) transmission, and in a case that, based on the configuration of the special subframe having the normal CP used in downlink and based on a length of a control region in the DwPTS, the DwPTS is determined to satisfy a division condition corresponding to a predefined division pattern of short TTIs, divide the short TTIs in the DwPTS based on the predefined division pattern of short TTIs.

The device for dividing short TTIs in the special subframe provided in the embodiments of the present disclosure determines a solution of dividing short TTIs in the DwPTS based on a configuration of a special subframe having a normal cyclic prefix (CP) used in downlink and based on a length of a control region in the DwPTS, and may prevent a short TTI with single-symbol data transmission from emerging, and ensures a stability of data transmission. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

In some optional embodiments, the first division module 1301 is specifically configured to: in a case that the configuration of a special subframe having the normal CP used in downlink is the second configuration, the fourth configuration, the seventh configuration, the ninth configuration, or the tenth configuration specified in the network protocol, and the quantity of symbols occupied by the control region in the DwPTS is two, determine that the DwPTS satisfies a division condition corresponding to a first division pattern of short TTIs defined in advance, and dividing short TTIs in the DwPTS based on the first division pattern of short TTIs, wherein, the first division pattern of short TTIs is a division pattern in which each of the short TTIs in the DwPTS occupies two symbols.

In some optional embodiments, after the first division module divides the short TTIs in the DwPTS based on the first division pattern of short TTIs, in a case that the configuration of the special subframe having the normal CP used in downlink is the ninth configuration or the tenth configuration specified in the network protocol, a division pattern of short TTIs in the DwPTS is as follows: the quantities of symbols occupied by the first short TTI to the last short TTI are 2, 2, 2, respectively; in a case that the configuration of the special subframe having the normal CP used in downlink is the second configuration or the seventh configuration specified in the network protocol, the division pattern of short TTIs in the DwPTS is as follows: the quantities of symbols occupied by the first short TTI to the last short TTI are 2, 2, 2, 2, 2, respectively; in a case that the configuration of the special subframe having the normal CP used in downlink is the fourth configuration specified in the network protocol, the division pattern of short TTIs in the DwPTS is as follows: the quantities of symbols occupied by the first short TTI to the last short TTI are 2, 2, 2, 2, 2, 2, respectively.

In some optional embodiments of the present disclosure, the first division module 1301 is specifically configured to: in a case that the configuration of the special subframe having the normal CP used in downlink is the second configuration, the fourth configuration, the seventh configuration, the ninth configuration, or the tenth configuration specified in the network protocol, and the quantity of symbols occupied by the control region in the DwPTS is one, determine that the DwPTS satisfies a division condition corresponding to a second division pattern of short TTIs defined in advance, and divide short TTIs in the DwPTS based on the second division pattern of short TTIs, wherein, the second division pattern of short TTIs is a division pattern in which the first short TTI occupies one symbol or three symbols, the second short TTI occupies three symbols, each of short TTIs other than the first short TTI and the second short TTI occupies two symbols; the first short TTI is a short TTI in which the control region in the DwPTS is located.

In some optional embodiments of the present disclosure, the first short TTI is a first short TTI in the DwPTS, the second short TTI is the last short TTI in the DwPTS, and after the first division module divides the short TTIs in the DwPTS based on the second division pattern of short TTIs and in a case that the configuration of the special subframe having the normal CP used in downlink is the ninth configuration or the tenth configuration specified in the network protocol, a division pattern of short TTIs in the DwPTS is as follows: the quantities of symbols occupied by the first short TTI to the last short TTI are 1, 2, 3, respectively, or, 3, 3, respectively. In a case that the configuration of the special subframe having the normal CP used in downlink is the second configuration or the seventh configuration specified in the network protocol, a division pattern of short TTIs in the DwPTS is as follows: the quantities of symbols occupied by the first short TTI to the last short TTI are 1, 2, 2, 2, 3, respectively, or 3, 2, 2, 3, respectively. In a case that the configuration of the special subframe having the normal CP used in downlink is the fourth configuration specified in the network protocol, a division pattern of short TTIs in the DwPTS is as follows: the quantities of symbols occupied by the first short TTI to the last short TTI are 1, 2, 2, 2, 2, 3, respectively, or 3, 2, 2, 2, 3, respectively.

In some optional embodiments, the first division module 1301 is specifically configured to: in a case that the configuration of the special subframe having the normal CP used in downlink is the second configuration, the fourth configuration, the seventh configuration, the ninth configuration, or the tenth configuration specified in the network protocol, and the quantity of symbols occupied by the control region in the DwPTS is one or two, determine that the DwPTS satisfies a division condition corresponding to a third division pattern of short TTIs defined in advance, and divide short TTIs in the DwPTS based on the third division pattern of short TTIs, wherein, the third division pattern of short TTIs is a division pattern in which the first short TTI occupies four symbols, the second short TTI occupies two symbols, each of short TTIs other than the first short TTI and the second short TTI occupies two symbols; the first short TTI is a short TTI in which the control region in the DwPTS is located.

In some optional embodiments, the first short TTI is a first short TTI in the DwPTS, the second short TTI is the last short TTI in the DwPTS. After the first division module divides the short TTIs in the DwPTS based on the third division pattern of short TTIs and in a case that the configuration of a special subframe having the normal CP used in downlink is the ninth configuration or the tenth configuration specified in the network protocol, a division pattern of short TTIs in the DwPTS is as follows: the quantities of symbols occupied by the first short TTI to the last short TTI are 4, 2, respectively; in a case that the configuration of the special subframe having the normal CP used in downlink is the second configuration or the seventh configuration specified in the network protocol, a division pattern of short TTIs in the DwPTS is as follows: the quantities of symbols occupied by the first short TTI to the last short TTI are 4, 2, 2, 2, respectively; in a case that the configuration of the special subframe having the normal CP used in downlink is the fourth configuration specified in the network protocol, a division pattern of short TTIs in the DwPTS is as follows: the quantities of symbols occupied by the first short TTI to the last short TTI are 4, 2, 2, 2, 2, respectively.

In some optional embodiments, the first division module 1301 is specifically configured to: in a case that the configuration of a special subframe having the normal CP used in downlink is the first configuration, the third configuration, the sixth configuration, or the eighth configuration specified in the network protocol, and the quantity of symbols occupied by the control region in the DwPTS is one or two, determine that the DwPTS satisfies a division condition corresponding to a fourth division pattern of short TTIs defined in advance, and divide short TTIs in the DwPTS based on the fourth division pattern of short TTIs, wherein, the fourth division pattern of short TTIs is a division pattern in which the quantity of symbols occupied by the first short TTI is four, the quantity of symbol occupied by the second short TTI is three, each of short TTIs other than the first short TTI and the second short TTI occupies two symbols; the first short TTI is a short TTI in which the control region in the DwPTS is located.

In some optional embodiments of the present disclosure, the first short TTI is the first short TTI in the DwPTS, the second short TTI is the last short TTI in the DwPTS. After the first division module divides the short TTIs in the DwPTS based on the fourth division pattern of short TTIs, and in a case that the configuration of a special subframe having the normal CP used in downlink is the first configuration or the sixth configuration specified in the network protocol, a division pattern of short TTIs in the DwPTS is as follows: the quantities of symbols occupied by the first short TTI to the last short TTI are 4, 2, 3, respectively; in a case that the configuration of a special subframe having the normal CP used in downlink is the third configuration or the eighth configuration specified in the network protocol, a division pattern of short TTIs in the DwPTS is as follows: the quantities of symbols occupied by the first short TTI to the last short TTI are 4, 2, 2, 3, respectively.

In some optional embodiments, the first division module 1301 is specifically configured to: in a case that the configuration of a special subframe having the normal CP used in downlink is the second configuration or the seventh configuration specified in the network protocol, and the quantity of symbols occupied by the control region in the DwPTS is two, determine that the DwPTS satisfies a division condition corresponding to a fifth division pattern of short TTIs defined in advance, and divide short TTIs in the DwPTS based on the fifth division pattern of short TTIs, wherein, the fifth division pattern of short TTIs is a division pattern in which the quantities of symbols occupied by the first short TTI to the last short TTI are 2, 3, 2, 3, respectively; in a case that the configuration of a special subframe having the normal CP used in downlink is the fourth configuration specified in the network protocol, and the quantity of symbols occupied by the control region in the DwPTS is two, determine that the DwPTS satisfies a division condition corresponding to a sixth division pattern of short TTIs defined in advance, and divide short TTIs in the DwPTS based on the sixth division pattern of short TTIs, wherein, the sixth division pattern of short TTIs is a division pattern in which the quantities of symbols occupied by the first short TTI to the last short TTI are 2, 3, 2, 2, 3, respectively, or 2, 3, 2, 3, 2, respectively.

In some optional embodiments, the first division module 1301 is specifically configured to: in a case that the configuration of a special subframe having the normal CP used in downlink is the ninth configuration or the tenth configuration specified in the network protocol, and the quantity of symbols occupied by the control region in the DwPTS is one, determine that the DwPTS satisfies a division condition corresponding to a seventh division pattern of short TTIs defined in advance, and divide short TTIs in the DwPTS based on the seventh division pattern of short TTIs; wherein, the seventh division pattern of short TTIs is a division pattern in which the quantities of symbols occupied by the first short TTI to the last short TTI are 1, 3, 2, respectively; in a case that the configuration of a special subframe having the normal CP used in downlink is the second configuration or the seventh configuration specified in the network protocol, and the quantity of symbols occupied by the control region in the DwPTS is one, determine that the DwPTS satisfies a division condition corresponding to an eighth division pattern of short TTIs defined in advance, and divide short TTIs in the DwPTS based on the eighth division pattern of short TTIs, wherein, the eighth division pattern of short TTIs is a division pattern in which the quantities of symbols occupied by the first short TTI to the last short TTI are 3, 2, 2, 3, respectively; in a case that the configuration of a special subframe having the normal CP used in downlink is the fourth configuration specified in the network protocol, and the quantity of symbols occupied by the control region in the DwPTS is one, determine that the DwPTS satisfies a division condition corresponding to a ninth division pattern of short TTIs defined in advance, and divide short TTIs in the DwPTS based on the ninth division pattern of short TTIs, wherein, the ninth division pattern of short TTIs is a division pattern in which the quantities of symbols occupied by the first short TTI to the last short TTI are 3, 2, 2, 2, 3, respectively, or 3, 2, 2, 3, 2, respectively.

In some optional embodiments, the device further includes a second division module 1302. The second division module 1302 is configured to: in a case that a configuration of a special subframe having a normal CP is used in uplink and a Uplink Pilot Time Slot UpPTS of the special subframe is used for short-TTI transmissions, and if the configuration of the special subframe having the normal CP used in uplink is a tenth configuration specified by a network protocol, divide short TTIs in the UpPTS based on a pattern in which the quantities of symbols occupied by a first short TTI to the last short TTI are 2, 2, 2, respectively, or 3, 3, respectively, or 4, 2, respectively.

In some optional embodiments, the device further includes a third division module 1303. The third division module 1303 is configured to: in a case that configurations of special frames having a normal CP are used in uplink and in downlink, and both a DwPTS and a UpPTS in a same special subframe are used for short-TTI transmissions, and in a case that each of the configurations of special frames having the normal CP used in uplink and in downlink is the ninth configuration or the tenth configuration, and the quantity of symbols occupied by the control region in the DwPTS is two, divide short TTIs in the special subframe based on a pattern in which the quantities of symbols occupied by the first short TTI to the last short TTI are 2, 2, 2, 2, 2, 2, 2, respectively, or 2, 2, 2, 3, 3, 2, respectively, or 2, 2, 2, 2, 4, 2, respectively, or 2, 2, 2, 2, 2, 4, respectively; in a case that each of the configurations of special frames having the normal CP used in uplink and in downlink is the ninth configuration or the tenth configuration specified by the network, and the quantity of symbols occupied by the control region in the DwPTS is one, divide short TTIs in the special subframe based on a pattern in which the quantities of symbols occupied by the first short TTI to the last short TTI are 3, 3, 2, 3, 3, respectively, or 3, 3, 2, 2, 2, 2, respectively, or 3, 3, 2, 2, 4, respectively, or 3, 3, 2, 4, 2, respectively.

In some optional embodiments, the device further includes a fourth division module 1304. The fourth division module 1304 is configured to: in a case that configurations of special frames having a normal CP are used in uplink and in downlink, and both the DwPTS and the UpPTS in a same special subframe are used for short-TTI transmissions, and in a case that each of the configurations of special frames having the normal CP used in uplink and in downlink is the ninth configuration or the tenth configuration specified in the network protocol, and the quantity of symbols occupied by the control region in the DwPTS is one or two, divide short TTIs in the special subframe based on a pattern in which the quantities of symbols occupied by the first short TTI to the last short TTI are 4, 2, 2, 2, 2, 2, respectively, or 4, 2, 2, 4, 2, respectively, or 4, 2, 2, 2, 4, respectively, or 4, 2, 2, 3, 3, respectively.

In some optional embodiments, the device further includes a fifth division module 1305. The fifth division module 1305 is configured to: in a case that configurations of special frames having a normal CP are used in uplink and in downlink, and both a DwPTS and an UpPTS in a same special subframe are used for short-TTI transmissions, and in a case that each of the configurations of special frames having the normal CP used in uplink and in downlink is the second configuration, the fourth configuration, or the seventh configuration specified by a network protocol, and the quantity of symbols occupied by the control region in the DwPTS is two, divide short TTIs in the special subframe based on a pattern in which the quantities of symbols occupied by the first short TTI to the last short TTI are 2, 3, 2, 3, 2, 2 respectively; in a case that each of the configurations of special frames having the normal CP used in uplink and in downlink is the second configuration, the fourth configuration, or the seventh configuration specified in the network protocol, and the quantity of symbols occupied by the control region in the DwPTS is one, divide short TTIs in the special subframe based on a pattern in which the quantities of symbols occupied by the first short TTI to the last short TTI are 3, 2, 2, 3, 2, 2 respectively.

In some optional embodiments, the device further includes a sixth division module 1306. The sixth division module 1306 is configured to: in a case that configurations of special frames having a normal CP are used in uplink and in downlink, and both a DwPTS and an UpPTS in a same special subframe are used for short-TTI transmissions: in a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is two, divide short TTIs in the special subframe based on a pattern in which the quantities of symbols occupied by the first short TTI to the last short TTI are 2, 3, 2, 2, 2, 3, respectively; in a case that each of the configurations of special frames having the normal CP used in uplink and in downlink is the first configuration, the third configuration, the sixth configuration, or the eighth configuration, and the quantity of symbols occupied by the control region in the DwPTS is one, divide short TTIs in the special subframe based on a pattern in which the quantities of symbols occupied by the first short TTI to the last short TTI are 3, 2, 2, 2, 2, 3 respectively.

The device for dividing short TTIs in the special subframe provided in the embodiments of the present disclosure determines a solution of dividing short TTIs in the DwPTS based on a configuration of a special subframe having a normal cyclic prefix (CP) used in downlink and a length of a control region in the DwPTS, and may prevent a short TTI with single-symbol data transmission from emerging, and ensures a stability of data transmission. Addressed are the problem in the related art that no clear division pattern of short TTIs is provided for a special subframe and the problem that, if a short-TTI transmission needs to be performed in the DwPTS in the special subframe, a current division pattern of short TTIs may cause a short TTI with single-symbol data transmission to emerge.

It is noted that, the device for dividing short TTIs in a special subframe in this embodiment is a device corresponding to the method for dividing short TTIs in a special subframe, and all implementations in the method in the above embodiment are applicable to the device in this embodiment and may achieve the same technical effect.

Some embodiments of the present disclosure further provide a device for dividing short TTIs in a special subframe. The device for dividing short TTIs in a special subframe includes a processor, a storage, and a transceiver, wherein the storage is configured to store programs and data used when the processor performs an operation, and in a case that the processor invokes and executes the programs and the data stored in the storage, the processor implements following steps: in a case that a configuration of a special subframe having a normal cyclic prefix (CP) is used in downlink, and a Downlink Pilot Time Slot (DwPTS) of the special subframe is used for a short Transmission Time Interval (TTI) transmission, and in a case that the DwPTS is determined to satisfy a division condition corresponding to a predefined division pattern of short TTIs based on a configuration of a special subframe having a normal CP used in downlink and based on a length of a control region in the DwPTS, dividing short TTIs in the DwPTS based on the predefined division pattern of short TTIs, wherein the transceiver is used to receive and transmit data.

In the embodiments of the present disclosure, it should be understood that sequential quantities in methods of the present disclosure do not represent a sequential order for performing steps in the methods. An order for performing the steps should be determined according to an inherent functional or logical sequence of the steps, and should not limit ways in which the steps are executed in the embodiments of the present disclosure.

The above are only optional embodiments of the present disclosure. It should be pointed out that numerous modifications and embellishments can be done by one skilled in the art without departing the spirit of the present disclosure. Such modifications and embellishments should also be considered to be within the protection scope of the present disclosure.

What is claimed is:

1. A method for dividing short Transmission Time Intervals (TTIs) of a special subframe, comprising:
   in a case that a configuration of a special subframe having a normal cyclic prefix (CP) is used in downlink, and a Downlink Pilot Time Slot (DwPTS) of the special subframe is used for short TTI transmission, dividing short TTIs in the DwPTS based on a predefined division pattern of short TTIs in a case that based on the configuration of the special subframe having the normal CP used in downlink and based on a length of a control region in the DwPTS, the DwPTS is determined to satisfy a division condition corresponding to the predefined division pattern of short TTIs.

2. The method according to claim 1, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to a predefined division pattern of short TTIs, comprises:

in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is two, determining that the DwPTS satisfies a division condition corresponding to a first division pattern of short TTIs defined in advance, and dividing short TTIs in the DwPTS based on the first division pattern of short TTIs, wherein, the first division pattern of short TTIs is a division pattern in which each of the short TTIs in the DwPTS occupies two symbols.

3. The method according to claim 2, wherein, after dividing short TTIs in the DwPTS based on the first division pattern of short TTIs, in a case that the configuration of the special subframe having the normal CP used in downlink is the ninth configuration or the tenth configuration specified in the network protocol, a division pattern of short TTIs in the DwPTS is a pattern in which quantities of symbols occupied by a first short TTI to a last short TTI are 2, 2, 2, respectively;

in a case that the configuration of the special subframe having the normal CP used in downlink is the second configuration or the seventh configuration specified in the network protocol, the division pattern of short TTIs in the DwPTS is a pattern in which quantities of symbols occupied by the first short TTI to the last short TTI are 2, 2, 2, 2, 2, respectively;

in a case that the configuration of the special subframe having the normal CP used in downlink is the fourth configuration specified in the network protocol, the division pattern of short TTIs in the DwPTS is a pattern in which quantities of symbols occupied by the first short TTI to the last short TTI are 2, 2, 2, 2, 2, 2, respectively.

4. The method according to claim 1, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is one, determining that the DwPTS satisfies a division condition corresponding to a second division pattern of short TTIs defined in advance, and dividing short TTIs in the DwPTS based on the second division pattern of short TTIs, wherein, the second division pattern of short TTIs is a division pattern in which a first short TTI occupies one symbol or three symbols, a second short TTI occupies three symbols, each of short TTIs other than the first short TTI and the second short TTI occupies two symbols; the first short TTI is a short TTI in which the control region in the DwPTS is located.

5. The method according to claim 1, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is one or two, determining that the DwPTS satisfies a division condition corresponding to a third division pattern of short TTIs defined in advance, and dividing short TTIs in the DwPTS based on the third division pattern of short TTIs, wherein, the third division pattern of short TTIs is a division pattern in which a first short TTI occupies four symbols, a second short TTI occupies two symbols, each of short TTIs other than the first short TTI and the second short TTI occupies two symbols; the first short TTI is a short TTI in which the control region in the DwPTS is located.

6. The method according to claim 1, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a first configuration, a third configuration, a sixth configuration, or an eighth configuration specified in a network protocol, and a quantity of symbols occupied by the control region in the DwPTS is one or two, determining that the DwPTS satisfies a division condition corresponding to a fourth division pattern of short TTIs defined in advance, and dividing short TTIs in the DwPTS based on the fourth division pattern of short TTIs, wherein, the fourth division pattern of short TTIs is a division pattern in which a first short TTI occupies four symbols, a second short TTI occupies three symbols, each of short TTIs other than the first short TTI and the second short TTI occupies two symbols; the first short TTI is a short TTI in which the control region in the DwPTS is located.

7. The method according to claim 1, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a second configuration or a seventh configuration specified in a network protocol, and a quantity of symbols occupied by the control region in the DwPTS is two, determining that the DwPTS satisfies a division condition corresponding to a fifth division pattern of short TTIs defined in advance, and dividing short TTIs in the DwPTS based on the fifth division pattern of short TTIs, wherein, the fifth division pattern of short TTIs is a division pattern in which quantities of symbols occupied by a first short TTI to a last short TTI are 2, 3, 2, 3, respectively;

in a case that the configuration of the special subframe having the normal CP used in downlink is a fourth configuration specified in a network protocol, and a quantity of symbols occupied by the control region in the DwPTS is two, determining that the DwPTS satisfies a division condition corresponding to a sixth division pattern of short TTIs defined in advance, and dividing short TTIs in the DwPTS based on the sixth division pattern of short TTIs, wherein, the sixth division pattern of short TTIs is a division pattern in which quantities of symbols occupied by the first short TTI to the last short TTI are 2, 3, 2, 2, 3, respectively, or 2, 3, 2, 3, 2, respectively.

8. The method according to claim 1, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a ninth configuration or a tenth configuration specified in a network protocol, and a quantity of symbols occupied by the control region in the DwPTS is one, determining that the DwPTS satisfies a division condition corresponding to a seventh division pattern of short TTIs defined in advance, and dividing short TTIs in the DwPTS based on the seventh division pattern of short TTIs, wherein, the seventh division pattern of short TTIs is a division pattern in which quantities of symbols occupied by the first short TTI to the last short TTI are 1, 3, 2, respectively;

in a case that the configuration of the special subframe having the normal CP used in downlink is a second configuration or a seventh configuration specified in a network protocol, and a quantity of symbols occupied by the control region in the DwPTS is one, determining that the DwPTS satisfies a division condition corresponding to an eighth division pattern of short TTIs defined in advance, and dividing short TTIs in the DwPTS based on the eighth division pattern of short TTIs, wherein, the eighth division pattern of short TTIs is a division pattern in which quantities of symbols occupied by the first short TTI to the last short TTI are 3, 2, 2, 3,respectively;

in a case that the configuration of the special subframe having the normal CP used in downlink is a fourth configuration specified in a network protocol, and a quantity of symbols occupied by the control region in the DwPTS is one, determining that the DwPTS satisfies a division condition corresponding to a ninth division pattern of short TTIs defined in advance, and dividing short TTIs in the DwPTS based on the ninth division pattern of short TTIs, wherein, the ninth division pattern of short TTIs is a division pattern in which quantities of symbols occupied by the first short TTI to the last short TTI are 3, 2, 2, 2, 3,respectively, or 3, 2, 2, 3, 2, respectively.

9. The method according to claim 1, further comprising:
in a case that a configuration of a special subframe having a normal CP is used in uplink and an Uplink Pilot Time Slot (UpPTS) of the special subframe is used for short-TTI transmission, dividing short TTIs in the UpPTS based on a pattern in which quantities of symbols occupied by a first short TTI to a last short TTI are 2, 2, 2, respectively, or 3, 3, respectively, or 4, 2, respectively, in a case that the configuration of the special subframe having the normal CP used in uplink is a tenth configuration specified by a network protocol.

10. The method according to claim 1, further comprising:
in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a ninth configuration or a tenth configuration specified in the network protocol, and a quantity of symbols occupied by the control region in the DwPTS is two, dividing short TTIs in a special subframe based on a pattern in which quantities of symbols occupied by a first short TTI to a last short TTI are 2, 2, 2, 2, 2, 2, 2, respectively, or 2, 2, 2, 3, 3, 2, respectively, or 2, 2, 2, 2, 4, 2, respectively, or 2, 2, 2, 2, 2, 4, respectively;

in a case that each of the configurations of special frames having the normal CP used in uplink and in downlink is the ninth configuration or the tenth configuration specified in the network protocol, and a quantity of symbols occupied by the control region in the DwPTS is one, dividing short TTIs in a special subframe based on a pattern in which quantities of symbols occupied by a first short TTI to a last short TTI are 3, 3, 2, 3, 3, respectively, or 3, 3, 2, 2, 2, 2, respectively, or 3, 3, 2, 2, 4, respectively, or 3, 3, 2, 4, 2, respectively;

or, in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a ninth configuration or a tenth configuration specified in the network protocol, and a quantity of symbols occupied by the control region in the DwPTS is one or two, dividing short TTIs in a special subframe based on a pattern in which quantities of symbols occupied by a first short TTI to a last short TTI are 4, 2, 2, 2, 2, 2, respectively, or 4, 2, 2, 4, 2, respectively, or 4, 2, 2, 2, 4, respectively, or 4, 2, 2, 3, 3, respectively;

or, in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a second configuration, a fourth configuration, or a seventh configuration specified in the network protocol, and a quantity of symbols occupied by the control region in the DwPTS is two, dividing short TTIs in a special subframe based on a pattern in which quantities of symbols occupied by a first short TTI to a last short TTI are 2, 3, 2, 3, 2, 2, respectively;

in a case that each of the configurations of special frames having the normal CP used in uplink and in downlink is the second configuration, the fourth configuration, or the seventh configuration specified in the network protocol, and the quantity of symbols occupied by the control region in the DwPTS is one, dividing short TTIs in a special subframe based on a pattern in which quantities of symbols occupied by the first short TTI to the last short TTI are 3, 2, 2, 3, 2, 2, respectively;

or, in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a first configuration, a third configuration, a sixth configuration, or an eighth configuration specified in the network protocol, and a quantity of symbols occupied by the control region in the DwPTS is two, dividing short TTIs in a special subframe based on a pattern in which quantities of symbols occupied by a first short TTI to a last short TTI are 2, 3, 2, 2, 2, 3, respectively;

in a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is one, dividing short TTIs in a special subframe based on a pattern in which quantities of symbols occupied by the first short TTI to the last short TTI are 3, 2, 2, 2, 2, 3, respectively.

11. A device for dividing short Transmission Time Intervals (TTIs) of a special subframe, comprising:

a processor, a storage, and a transceiver, wherein the storage is configured to store programs and data used by the processor when the processor performs operations, and when the processor invokes and performs the programs and the data stored in the storage, the processor performs following steps:

in a case that a configuration of a special subframe having a normal cyclic prefix (CP) is used in downlink, and a Downlink Pilot Time Slot (DwPTS) of the special subframe is used for short TTI transmission, dividing short TTIs in the DwPTS based on a predefined division pattern of short TTIs in a case that based on the configuration of the special subframe having the normal CP used in downlink and based on a length of a control region in the DwPTS, the DwPTS is determined to satisfy a division condition corresponding to the predefined division pattern of short TTIs;

wherein the transceiver is configured to receive data and transmit data.

12. The device according to claim 11, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to a predefined division pattern of short TTIs, comprises:

in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is two, determining that the DwPTS satisfies a division condition corresponding to a first division pattern of short TTIs defined in advance, and dividing short TTIs in the DwPTS based on the first division pattern of short TTIs, wherein, the first division pattern of short TTIs is a division pattern in which each of the short TTIs in the DwPTS occupies two symbols.

13. The device according to claim 12, wherein, after dividing short TTIs in the DwPTS based on the first division pattern of short TTIs, in a case that the configuration of the special subframe having the normal CP used in downlink is the ninth configuration or the tenth configuration specified in the network protocol, a division pattern of short TTIs in the DwPTS is a pattern in which quantities of symbols occupied by a first short TTI to a last short TTI are 2, 2, 2, respectively;

in a case that the configuration of the special subframe having the normal CP used in downlink is the second configuration or the seventh configuration specified in the network protocol, the division pattern of short TTIs in the DwPTS is a pattern in which quantities of symbols occupied by the first short TTI to the last short TTI are 2, 2, 2, 2, 2, respectively;

in a case that the configuration of the special subframe having the normal CP used in downlink is the fourth configuration specified in the network protocol, the division pattern of short TTIs in the DwPTS is a pattern in which quantities of symbols occupied by the first short TTI to the last short TTI are 2, 2, 2, 2, 2, 2, respectively.

14. The device according to claim 11, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is one, determining that the DwPTS satisfies a division condition corresponding to a second division pattern of short TTIs defined in advance, and dividing short TTIs in the DwPTS based on the second division pattern of short TTIs, wherein, the second division pattern of short TTIs is a division pattern in which a first short TTI occupies one symbol or three symbols, a second short TTI occupies three symbols, each of short TTIs other than the first short TTI and the second short TTI occupies two symbols; the first short TTI is a short TTI in which the control region in the DwPTS is located.

15. The device according to claim 11, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a second configuration, a fourth configuration, a seventh configuration, a ninth configuration, or a tenth configuration specified in a network protocol, and a quantity of symbols occupied by the control region in the DwPTS is one or two, determining that the DwPTS satisfies a division condition corresponding to a third division pattern of short TTIs defined in advance, and dividing short TTIs in the DwPTS based on the third division pattern of short TTIs, wherein, the third division pattern of short TTIs is a division pattern in which a first short TTI occupies four symbols, a second short TTI occupies two symbols, each of short TTIs other than the first short TTI and the second short TTI occupies two symbols; the first short TTI is a short TTI in which the control region in the DwPTS is located.

16. The device according to claim 11, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a first configuration, a third configuration, a sixth configuration, or an eighth configuration specified in a network protocol, and a quantity of symbols occupied by the control region in the DwPTS is one or two, determining that the DwPTS satisfies a division condition corresponding to a fourth division pattern of short TTIs defined in advance, and dividing short TTIs in the DwPTS based on the fourth division pattern of short TTIs, wherein, the fourth division pattern of short TTIs is a division pattern in which a first short TTI occupies four symbols, a second short TTI occupies three symbols, each of short TTIs other than the first short TTI and the second short TTI occupies two symbols; the first short TTI is a short TTI in which the control region in the DwPTS is located.

17. The device according to claim 11, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a second configuration or a seventh configuration specified in a network protocol, and a quantity of symbols occupied by the control region in the DwPTS is two, determining that the DwPTS satisfies a division condition corresponding to a fifth division pattern of short TTIs defined in advance, and dividing short TTIs in the DwPTS based on the fifth division pattern of short TTIs, wherein, the fifth division pattern of short TTIs is a division pattern in which quantities of symbols occupied by a first short TTI to a last short TTI are 2, 3, 2, 3, respectively;

in a case that the configuration of the special subframe having the normal CP used in downlink is a fourth configuration specified in a network protocol, and a quantity of symbols occupied by the control region in the DwPTS is two, determining that the DwPTS satisfies a division condition corresponding to a sixth division pattern of short TTIs defined in advance, and dividing short TTIs in the DwPTS based on the sixth division pattern of short TTIs, wherein, the sixth division pattern of short TTIs is a division pattern in which quantities of symbols occupied by the first short TTI to the last short TTI are 2, 3, 2, 2, 3, respectively, or 2, 3, 2, 3, 2, respectively.

18. The device according to claim 11, wherein, the dividing short TTIs in the DwPTS based on the predefined division pattern of short TTIs in a case that based on the configuration of the special subframe having the normal CP used in downlink and based on the length of the control region in the DwPTS, the DwPTS is determined to satisfy the division condition corresponding to the predefined division pattern of short TTIs, comprises:

in a case that the configuration of the special subframe having the normal CP used in downlink is a ninth configuration or a tenth configuration specified in a network protocol, and a quantity of symbols occupied by the control region in the DwPTS is one, determining that the DwPTS satisfies a division condition corresponding to a seventh division pattern of short TTIs defined in advance, and dividing short TTIs in the DwPTS based on the seventh division pattern of short TTIs, wherein, the seventh division pattern of short TTIs is a division pattern in which quantities of symbols occupied by the first short TTI to the last short TTI are 1, 3, 2, respectively;

in a case that the configuration of the special subframe having the normal CP used in downlink is a second configuration or a seventh configuration specified in a network protocol, and a quantity of symbols occupied by the control region in the DwPTS is one, determining that the DwPTS satisfies a division condition corresponding to an eighth division pattern of short TTIs defined in advance, and dividing short TTIs in the DwPTS based on the eighth division pattern of short TTIs, wherein, the eighth division pattern of short TTIs is a division pattern in which quantities of symbols occupied by the first short TTI to the last short TTI are 3, 2, 2, 3, respectively;

in a case that the configuration of the special subframe having the normal CP used in downlink is a fourth configuration specified in a network protocol, and a quantity of symbols occupied by the control region in the DwPTS is one, determining that the DwPTS satisfies a division condition corresponding to a ninth division pattern of short TTIs defined in advance, and dividing short TTIs in the DwPTS based on the ninth division pattern of short TTIs, wherein, the ninth division pattern of short TTIs is a division pattern in which quantities of symbols occupied by the first short TTI to the last short TTI are 3, 2, 2, 2, 3,respectively, or 3, 2, 2, 3, 2, respectively.

19. The device according to claim 11, wherein when the processor invokes and performs the programs and the data stored in the storage, the processor further performs following steps:

in a case that a configuration of a special subframe having a normal CP is used in uplink and an Uplink Pilot Time Slot (UpPTS) of the special subframe is used for short-TTI transmission, dividing short TTIs in the UpPTS based on a pattern in which quantities of symbols occupied by a first short TTI to a last short TTI are 2, 2, 2, respectively, or 3, 3, respectively, or 4, 2, respectively, in a case that the configuration of the special subframe having the normal CP used in uplink is a tenth configuration specified by a network protocol.

20. The device according to claim 11, wherein when the processor invokes and performs the programs and the data stored in the storage, the processor further performs following steps:

in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a ninth configuration or a tenth configuration specified in the network protocol, and a quantity of symbols occupied by the control region in the DwPTS is two, dividing short TTIs in a special subframe based on a pattern in which quantities of symbols occupied by a first short TTI to a last short TTI are 2, 2, 2, 2, 2, 2, 2, respectively, or 2, 2, 2, 3, 3, 2, respectively, or 2, 2, 2, 2, 4, 2, respectively, or 2, 2, 2, 2, 2, 4, respectively;

in a case that each of the configurations of special frames having the normal CP used in uplink and in downlink is the ninth configuration or the tenth configuration specified in the network protocol, and a quantity of symbols occupied by the control region in the DwPTS is one, dividing short TTIs in a special subframe based on a pattern in which quantities of symbols occupied by a first short TTI to a last short TTI are 3, 3, 2, 3, 3, respectively, or 3, 3, 2, 2, 2, 2, respectively, or 3, 3, 2, 2, 4, respectively, or 3, 3, 2, 4, 2, respectively;

or, in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a ninth configuration or a tenth configuration specified in the network protocol, and a quantity of symbols occupied by the control region in the DwPTS is one or two, dividing short TTIs in a special subframe based on a pattern in which quantities of symbols occupied by a first short TTI to a last short TTI are 4, 2, 2, 2, 2, 2, respectively, or 4, 2, 2, 4, 2, respectively, or 4, 2, 2, 2, 4, respectively, or 4, 2, 2, 3, 3, respectively;

or, in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a second configuration, a fourth configuration, or a seventh configuration specified in the network protocol, and a quantity of symbols occupied by the control region in the DwPTS is two, dividing short TTIs in a special subframe based on a pattern in which quantities of symbols occupied by a first short TTI to a last short TTI are 2, 3, 2, 3, 2, 2, respectively;

in a case that each of the configurations of special frames having the normal CP used in uplink and in downlink is the second configuration, the fourth configuration, or the seventh configuration specified in the network protocol, and the quantity of symbols occupied by the control region in the DwPTS is one, dividing short TTIs in a special subframe based on a pattern in which quantities of symbols occupied by the first short TTI to the last short TTI are 3, 2, 2, 3, 2, 2, respectively;

or, in a case that configurations of special frames having the normal CP are used in uplink and in downlink, respectively, and both the DwPTS and an Uplink Pilot Time Slot (UpPTS) in a same special subframe are used for short-TTI transmission, in a case that each of the configurations of special frames having the normal CP used in uplink and in downlink is a first configuration, a third configuration, a sixth configuration, or an eighth configuration specified in the network protocol, and a quantity of symbols occupied by the control region in the DwPTS is two, dividing short TTIs in a special subframe based on a pattern in which quantities of symbols occupied by a first short TTI to a last short TTI are 2, 3, 2, 2, 2, 3, respectively;

in a case that each of the configurations of special frames having the normal CP used in uplink and in downlink is the first configuration, the third configuration, the sixth configuration, or the eighth configuration specified in the network protocol, and the quantity of symbols occupied by the control region in the DwPTS is one, dividing short TTIs in a special subframe based on a pattern in which quantities of symbols occupied by the first short TTI to the last short TTI are 3, 2, 2, 2, 2, 3, respectively.

* * * * *